(12) United States Patent
Yoshida et al.

(10) Patent No.: US 6,973,670 B1
(45) Date of Patent: Dec. 6, 2005

(54) IN-BUILDING CATV SYSTEM, DOWN-CONVERTER, UP-CONVERTER AND AMPLIFIER

(75) Inventors: Keisuke Yoshida, Nisshin (JP); Yoshifumi Sugiura, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 927 days.

(21) Appl. No.: 09/696,079

(22) Filed: Oct. 25, 2000

(30) Foreign Application Priority Data

Nov. 8, 1999 (JP) ............................. 11-317396
Feb. 22, 2000 (JP) ............................. 2000-044323

(51) Int. Cl.⁷ ............................................. H04N 7/173
(52) U.S. Cl. ..................... 725/121; 725/124; 725/126; 725/127; 725/78
(58) Field of Search ............................. 725/71, 74, 80, 725/105, 111, 118, 121, 124–128, 148, 149

(56) References Cited

U.S. PATENT DOCUMENTS

| | | | |
|---|---|---|---|
| 5,437,052 A * | 7/1995 | Hemmie et al. ............... | 725/73 |
| 5,557,319 A * | 9/1996 | Gurusami et al. ............. | 725/126 |
| 5,966,410 A * | 10/1999 | Freyman et al. ............... | 375/296 |
| 6,160,571 A * | 12/2000 | Wang .......................... | 725/127 |
| 6,581,208 B1 * | 6/2003 | Inaguma ....................... | 725/149 |
| 6,615,407 B1 * | 9/2003 | Inaguma ....................... | 725/78 |

* cited by examiner

Primary Examiner—Ngoc Vu
(74) Attorney, Agent, or Firm—Davis & Bujold, P.L.L.C.

(57) ABSTRACT

In an in-building CATV system in which an upward signal is frequency-converted to an in-building upward signal using an up-converter at a terminal side and the frequency-converted in-building upward signal is outputted to an external system after frequency-converting the in-building upward signal to an upward signal for outputting using a down-converter, a high frequency signal for frequency conversion leaking out from the up-converter is occasionally transmitted to the down-converter. Then, a trap circuit for removing the high frequency signal is provided on an in-building upward signal path in each converter. And an equalizer is provided on an upward signal path in each converter to compensate a transmission loss in the frequency band of the in-building upward signal occurring when the in-building upward signal is passed through the trap circuit.

17 Claims, 10 Drawing Sheets

TRAP CIRCUIT

FREQUENCY
CHARACTERISTIC

EQUALIZER

FREQUENCY
CHARACTERISTIC

IN-BUILDING CATV SYSTEM, DOWN-CONVERTER, UP-CONVERTER AND AMPLIFIER

FIELD OF THE INVENTION

The invention relates to an in-building CATV system provided in a building and connected to a lead-in wire from an external bi-directional CATV system for transmitting a downward signal inputted from the external bi-directional CATV system via a transmission line in the building to plural terminal devices in the building and for transmitting an upward signal outputted from each terminal device to the external bi-directional CATV system via the lead-in wire.

BACKGROUND OF THE INVENTION

In such an in-building CATV system, noises generated in various parts in the building flows into the transmission line via a terminal and the like at the subscriber side. A component of the noises with the same frequency as that of the upward signal is outputted to the external bi-directional CATV system together with the upward signal as a confluent noise.

Heretofore, in order to attenuate the confluent noise flowing out to the external bi-directional CATV system, the upward signal generated in the subscriber terminal device such as a cable modem (a signal in the frequency band (for example, 5 MHz–42 MHz) transmittable in the bi-directional CATV system) was frequency-converted to an upward signal (referred to as an in-building upward signal hereinafter) in a UHF band (for example, 913 MHz–950 MHz) which was higher than the original frequency and which did not overlap a transmission frequency of a downward signal (for example, 54 MHz–890 MHz). The in-building upward signal was transmitted toward the lead-in wire and was converted to an upward signal for outputting to the bi-directional CATV system (that is, an upward signal with a frequency of the upward signal in the bi-directional CATV system) using a down-converter, just before the upward signal was outputted to the lead-in wire from the transmission line in the building.

And in such an in-building CATV system, in order that the down-converter can correctly restore the original upward signal before frequency-converted (that is, the original upward signal outputted from the terminal device) from the in-building upward signal, the up-converter and the down-converter are constituted such that the upward signal and the in-building upward signal are frequency-converted using the high frequency signals with the same frequency by the up-converter and the down-converter, respectively.

However, according to experiments carried out by the present inventors, it was proved that the original upward signal can not be occasionally restored correctly at the down-converter in a large scale in-building CATV system with many up-converters, when such an in-building CATV system is actually constituted. Moreover, various experiments were carried out by the present inventors to solve the problem and the following facts were proved:

Firstly, when an upward signal of 5 MHz–42 MHz is to be frequency-converted to an in-building upward signal of 913 MHz–950 MHz by the up-converter, in order to frequency-convert the in-building upward signal to the upward signal in the original frequency band (5 MHz–42 MHz), the frequency of the high frequency signal used for frequency-converting each signal by the up-converter and the down-converter may be set to 908 MHz or 955 MHz.

However, when the frequency of the high frequency signal for frequency-conversion is set to such a value, the high frequency signal for frequency-conversion leaks out to the transmission line in the in-building CATV system from the up-converter together with the frequency-converted in-building upward signal. This is because the difference of frequency between the high frequency signal for frequency-conversion and the in-building upward signal is extremely small (in the above example, the difference is 5 MHz) so that the high frequency signal for frequency-conversion can not be removed well even when a filter circuit (a band path filter and the like) for selectively passing the in-building upward signal is provided on the in-building upward signal path in the up-converter.

Since an up-converter is provided for each terminal device which outputs the upward signal in the in-building CATV system, the amount of the high frequency signals leaking out from the up-converter to the transmission line increases as the number of the subscribers having such terminal devices increases (that is, as the scale of the in-building CATV system becomes large).

On the other hand, since each up-converter executes data communication with a communication device provided in the center equipment of the external bi-directional CATV system in a manner of time sharing, the plural up-converters do not output the in-building upward signals at the same time.

As a result, the high frequency signal leaking out from each up-converter is gathered or overlapped on the transmission line to be inputted to the down-converter, and the input level of the overlapped signals becomes high as the scale of the in-building CATV system becomes high. The input level occasionally exceeds the input level of the in-building upward signal.

Moreover, the high frequency signal thus inputted to the down-converter via the transmission line contains a noise component (referred to as a phase noise hereinafter) ranging to the lower and higher frequency sides from the regular frequency (995 MHz) as the center, due to a phase difference which occurs when the high frequency signal leaking out from each up-converter is overlapped on the transmission line and a fine deviation in the frequency of the high frequency signal from each up-converter.

Subsequently, as mentioned above, when the overlapped signal of the high frequency signal leaking out from each up-converter is inputted to the down-converter together with the in-building upward signal, the overlapped signal as well as the in-building upward signal is inputted to a circuit (usually, a mixer) for frequency-conversion.

Then, since the frequency of the overlapped signal (specifically, central frequency) is the same as that of the high frequency signal for frequency-conversion generated in the down-converter and its signal level is high, the overlapped signal leaks out to a signal path of the high frequency signal for frequency-conversion in the down-converter and the high frequency signal containing the above-mentioned phase noise is inputted to a frequency-conversion circuit as the high frequency signal for frequency-conversion.

As a result, the in-building upward signal is frequency-converted using the high frequency signal with low purity formed by superimposing the phase noise to the regular high frequency signal. The frequency-converted upward signal contains the phase noise ranging to the lower and higher frequency sides and the upward signal is occasionally buried in the peripheral phase noise especially in the large scale CATV system.

SUMMARY OF THE INVENTION

The present invention is presented to solve such problems. The object of the invention is that the upward signal for being outputted to the external bi-directional CATV system can be correctly restored by the down-converter without being influenced by the high frequency signal for frequency-conversion leaking out from the up-converter at the terminal side in the in-building CATV system in which the upward signal is frequency-converted to the in-building upward signal with a high frequency using the up-converter at the terminal side and the in-building upward signal is frequency-converted to the upward signal for being outputted to the external bi-directional CATV system using the down-converter at the lead-in wire side connected to the external bi-directional CATV system.

In order to achieve the object and others, in the in-building CATV system of the present invention, like the above-mentioned conventional in-building CATV system, the downward signal inputted from the external bi-directional CATV system via the lead-in wire is transmitted to plural terminals via transmission lines in the building, the in-building upward signal generated in the up-converter by frequency-converting the upward signal outputted from the terminal device at the subscriber side and inputted to each terminal via the up-converter is transmitted to the lead-in wire via the transmission line, the in-building upward signal is frequency-converted to an upward signal with a frequency lower than that of the downward signal for outputting to the bi-directional CATV system using the down-converter provided between the transmission line and the lead-in wire, and the upward signal is transmitted.

And in the in-building CATV system of the present invention, in order that the down-converter can correctly frequency-convert the in-building upward signal to the upward signal for outputting to the bi-directional CATV system corresponding to the original upward signal outputted from the terminal device without being influenced by the high frequency signal for frequency-conversion leaking out from the up-converter, a noise removal means is provided on the transmission path of the in-building upward signal from the up-converter to the down-converter. The noise removal means removes the high frequency signal with a specific frequency used in the up-converter for frequency-converting the upward signal to the in-building upward signal.

As a result, according to the in-building CATV system of the present invention, the phase noise generated when the high frequency signal for frequency-conversion leaking out to the transmission line from each up-converter connected to each terminal is overlapped on the transmission line is prevented from being added to the upward signal frequency-converted by the down-converter and from being transmitted to the external bi-directional CATV system. The upward signal for outputting to the bi-directional CATV system can be correctly restored by the down-converter and transmitted to the external bi-directional CATV system without deteriorating the quality of the upward signal.

Here, in the present invention, the upward signal outputted from the terminal device and the in-building upward signal may be designed to be frequency-converted by the up-converter and the down-converter using the high frequency signals with different frequencies, respectively, but the upward signal outputted from the terminal device and the in-building upward signal may be designed to be frequency-converted in each converter using the high frequency signal with the same frequency.

And when the high frequency signal with the same frequency is thus used in each converter, the upward signal restored by the down-converter can be a signal with the same frequency as that of the original upward signal outputted from the terminal device and the upward signal can be outputted to the bi-directional CATV system.

Moreover, the above-mentioned noise removal means may be constituted from a trap circuit and the trap circuit may be provided at least on one of the transmission line from the down-converter to each terminal, the in-building upward signal path in a transmission device provided on the transmission line, an output path of the in-building upward signal in the up-converter and an input path of the in-building upward signal in the down-converter.

And when the trap circuit is provided separately as a device independent from the other transmission devices on the transmission line in the in-building CATV system, the number of the transmission devices is increased. Therefore, the trap circuit may be provided in one of the various devices provided on the transmission line from the down-converter to each terminal such as an amplifier, a directional coupler, a splitter and the like, or provided in the up-converter or the down-converter.

Specifically, since a separate device as the trap circuit in extra is not necessary to be connected on the transmission line when the trap circuit is provided in the transmission device, in the up-converter or in the down-converter, the construction cost of the in-building CATV system of the present invention can be lowered.

The trap circuit is for removing the high frequency signal for frequency-conversion leaking out from the up-converter at the terminal side and can be constituted using a so-called resonance circuit. When it is difficult for one trap circuit to perfectly remove the high frequency signal, the trap circuits may be provided on plural positions on the transmission line of the in-building CATV system. For this purpose, trap circuits may be provided in the plural devices (the transmission device such as the amplifier, the up-converter, the down-converter and the like) constituting the in-building CATV system.

Since a filter circuit (a band path filter or the like) for cutting off the downward signal and for passing only the in-building upward signal is provided on the transmission path of the in-building upward signal in each of the transmission device, the up-converter and the down-converter, when the trap circuit is provided in either of these devices, the trap circuit is influenced by the filter circuit and the characteristic of the change of the attenuation near the frequency of the high frequency signal removed by the trap circuit is changed depending on whether an inductive reactance or a capacitive reactance is used when connecting the resonance circuit constituting the trap circuit to the transmission path of the in-building upward signal.

More specifically, when a parallel resonance circuit is connected to the transmission path of the in-building upward signal using the inductive reactance, a signal component corresponding to its series resonance frequency is attenuated by the series resonance of the capacitive component of the parallel resonance circuit and the inductive reactance. When such a trap circuit is provided on the transmission path of the in-building upward signal together with the filter circuit for passing the in-building upward signal consisting of a band path filter or the like, the frequency characteristic becomes such that the attenuation rapidly increases in the lower frequency side than the series resonance frequency as the center but does not change rapidly in the higher frequency side.

Conversely, when the parallel resonance circuit is connected to the transmission path of the in-building upward signal using the capacitive reactance, a signal component corresponding to its series resonance frequency is attenuated by the series resonance of the inductive component of the parallel resonance circuit and the capacitive reactance. When such a trap circuit is provided on the transmission path of the in-building upward signal together with the filter circuit for passing the in-building upward signal consisting of a band path filter or the like, the frequency characteristic becomes such that the attenuation rapidly increases in the higher frequency side than the series resonance frequency as the center but does not change rapidly in the lower frequency side.

Therefore, in the in-building CATV system, it is more preferable that the trap circuit is constituted such that the resonance circuit is connected to the transmission path of the in-building upward signal via the inductive reactance when the frequency of the high frequency signal for frequency-conversion is set to a higher frequency than that of the in-building upward signal and the trap circuit is provided in the transmission device, in the up-converter or in the down-converter. To the contrary, when the frequency of the high frequency signal for frequency-conversion is set to a lower frequency than that of the in-building up-ward signal and the trap circuit is provided in the transmission device, in the up-converter or in the down-converter, it is preferable that the trap circuit is constituted such that the resonance circuit is connected to the transmission path of the in-building upward signal via the capacitive reactance.

By doing so, the attenuation of the signal occurring in the trap circuit can be decreased rapidly in the vicinity of the frequency of the in-building upward signal comparing with the attenuation of the signal in the frequency of the high frequency signal for frequency-conversion and the loss occurring when the in-building upward signal is passed through the trap circuit can be kept minimum.

On the other hand, even if the trap circuit is constituted in such a way, the frequency characteristic of the in-building upward signal could occasionally be influenced when the in-building upward signal is passed through the trap circuit, depending on the difference of the frequency between the in-building upward signal and the high frequency signal for frequency-conversion and the resonance characteristic "Q" of the trap circuit.

In brief, for example, as mentioned above, in the system in which the upward signal with the frequency of 5 MHz–42 MHz is frequency-converted to the in-building upward signal with the frequency of 913 MHz–950 MHz by the up-converter, a signal with a frequency of 955 MHz is used as the high frequency signal for frequency-conversion and a signal with a frequency of 908 MHz can be used for the frequency-conversion other than the signal.

Therefore, in such a system, a resonance circuit with extremely high "Q" which passes the signal component not higher than 950 MHz (or not lower than 913) without loss and fully attenuates (for example, higher than several tens of dB) the high frequency signal of 955 MHz (or 908 MHz) should be used as the trap circuit for removing the high frequency signal.

However, in order to heighten the "Q" of the trap circuit, the resonance element used for the trap circuit should be of a high "Q" value and so there occurs a problem that the trap circuit becomes big and expensive.

To the contrary, when the trap circuit is constituted from a usual small-sizeable coil or capacitor to make the cost cheap, the "Q" of the trap circuit becomes low and the so-called sharpness of the frequency is aggravated. As a result, a problem occurs that the in-building upward signal has been attenuated near the frequency of the high frequency signal for frequency-conversion in the frequency band of the in-building upward signal (that is, in the higher and lower frequency sides of the transmission frequency band of the in-building upward signal).

And if such transmission loss occurs in the frequency band of the in-building upward signal when the in-building upward signal is passed through the trap circuit, the signal level of the frequency-converted upward signal becomes low in the high frequency or in the low frequency side due to the transmission loss occurring in the trap circuit and the upward signal with normal characteristic fails to be transmitted to the external bi-directional CATV system, even when the in-building upward signal can be frequency-converted to the upward signal for being outputted to the bi-directional CATV system without being influenced by the high frequency signal for frequency-conversion.

Then, in order that a cheaply available, usual trap circuit with relatively low "Q" can be used as the trap circuit, an equalizer for compensating the transmission loss in the frequency band of the in-building upward signal occurring when the in-building upward signal is passed through the trap circuit may be provided on the transmission path of the upward signal or of the in-building upward signal from the up-converter to the down-converter.

Specifically, by such a constitution, the transmission loss occurring when the in-building upward signal is passed through the trap circuit is compensated by the equalizer and the upward signal for being outputted to the bi-directional CATV system corresponding to the original upward signal outputted from the terminal device can be transmitted to the external bi-directional CATV system in the desired level in the whole frequency band.

Here, the equalizer is for compensating the transmission loss in the frequency band of the higher or lower frequency side of the in-building upward signal occurring when the in-building upward signal is passed through the trap circuit and for preventing the signal level of the upward signal transmitted to the external CATV system from becoming low in the high or low frequency side of the upward signal. Therefore the equalizer may be provided on the transmission path of the in-building upward signal on which the trap circuit is provided (in more detail, on the transmission line from the down-converter to each terminal, on the in-building upward signal path in the transmission device provided on the transmission line, on the output path of the in-building upward signal in the up-converter or on the input path of the in-building upward signal in the down-converter) or on the transmission path of the upward signal (on the input path of the upward signal in the up-converter, on the output path of the upward signal in the down-converter or the like).

Since the signal processing circuit such as the equalizer can be more easily designed as the frequency of the signal to be compensated is low and the setting position of the equalizer may be either on the transmission path of the in-building upward signal or the transmission path of the upward signal, the equalizer may be more preferably provided on the transmission path of the upward signal whose frequency is lower than that of the in-building upward signal (that is, on the input path of the upward signal in the up-converter or on the output path of the upward signal in the down-converter).

The equalizer, like the trap circuit, may also be provided in the up-converter, in the down-converter or in any of the various transmission devices provided on the transmission line such as the amplifier, the directional coupler, the splitter and the like. Moreover, when one equalizer can not compensate the transmission loss in the frequency band of the in-building upward signal occurring when the in-building upward signal is passed through the trap circuit, plural equalizers may be provided on the transmission path of the in-building upward signal or the upward signal in the in-building CATV system.

Subsequently, the down-converter in the in-building CATV system of the present invention transmits the downward signal inputted from the external bi-directional CATV system via the lead-in wire to the transmission line at the terminal side via a downward signal path of the down-converter. The down-converter frequency-converts the in-building upward signal to the upward signal for outputting to the bi-directional CATV system by mixing the in-building upward signal transmitted from the up-converter via the transmission line with the high frequency signal generated by a high frequency signal generating means of the down-converter using a frequency-conversion means of the down-converter and transmits the frequency-converted upward signal to the lead-in wire (that is, to the external bi-directional CATV system).

And in the down-converter of the present invention, a trap circuit for removing the high frequency signal used by the up-converter at the terminal side for frequency-conversion may be provided on the input path of the in-building upward signal to the frequency-conversion means of the down-converter.

When the down-converter is constituted in such a way, the high frequency signal inputted to the frequency-conversion means of the down-converter (specifically, the high frequency signal containing the phase noise, as mentioned above) is attenuated and the original upward signal for being outputted to the bi-directional CATV system can be restored correctly from the in-building upward signal using the frequency-conversion means of the down-converter, even if the high frequency signal for frequency-conversion leaking out from each of the plural up-converters at the terminal sides is overlapped on the transmission line and the overlapped high frequency signal is inputted to the down-converter from the transmission line together with the in-building upward signal.

Moreover, in the down-converter of the present invention, an equalizer for compensating the transmission loss in the frequency band of passing signal occurring when the in-building upward signal is passed through the trap circuit may be provided at least on one side of the input path of the in-building upward signal to the frequency-conversion means of the down-converter and of the output path of the upward signal from the frequency-conversion means of the down-converter.

When the down-converter is constituted in such a way, in the in-building CATV system in which the trap circuit for removing the high frequency signal for frequency-conversion leaking out from each up-converter at the terminal side is provided, the upward signal for being outputted to the bi-directional CATV system can be transmitted to the external bi-directional CATV system in the normal level in the whole frequency band, even if the signal level of the in-building upward signal in the frequency side near the high frequency signal for frequency-conversion is lowered due to the transmission loss in the trap circuit occurring when the in-building upward signal is passed through the trap circuit.

Subsequently, the up-converter in the in-building CATV system of the present invention transmits the downward signal which is sent to the terminal from the external bi-directional CATV system via the down-converter and the transmission line, to the terminal device via a downward signal path of the up-converter. The up-converter frequency-converts the upward signal outputted from the terminal device to the in-building upward signal by mixing the upward signal from the terminal device with the high frequency signal generated by a high frequency signal generating means of the up-converter using a frequency-conversion means of the up-converter and transmits the frequency-converted in-building upward signal to the terminal side (that is, to the transmission line in the in-building CATV system).

And in the up-converter of the present invention, a trap circuit for removing the high frequency signal generated by the high frequency signal generating means of the up-converter may be provided on the output path of the in-building upward signal from the frequency-conversion means of the up-converter.

When the up-converter is constituted in such a way, the high frequency signal used for frequency-converting the upward signal outputted from the terminal device to the in-building upward signal can be prevented from leaking out to the transmission line in the in-building CATV system and the down-converter can be prevented from failing to correctly restore the upward signal for outputting to the bi-directional CATV system by being influenced by the leak-out high frequency signal.

Also in the up-converter of the present invention, an equalizer for compensating the transmission loss occurring when the in-building upward signal is passed through the trap circuit may be provided at least on one side of the input path of the upward signal to the frequency-conversion means of the up-converter and the output path of the in-building upward signal from the frequency-conversion means of the up-converter.

When the up-converter is constituted in such a way, in the in-building CATV system in which the trap circuit for removing the high frequency signal for frequency-conversion leaking out from each up-converter at the terminal side to the transmission path of the in-building upward signal is provided, the upward signal for being outputted to the bi-directional CATV system can be transmitted to the external bi-directional CATV system from the down-converter in the normal level in the whole frequency band, even if the signal level of the in-building upward signal in the frequency side near the high frequency signal for frequency-conversion is lowered due to the transmission loss in the trap circuit occurring when the in-building upward signal outputted from the up-converter is passed through the trap circuit.

The high frequency signal generating means of the down-converter constituting the above-mentioned down-converter and the high frequency signal generating means of the up-converter constituting the above-mentioned up-converter may be constituted to generate either the high frequency signals with different frequencies or the high frequency signals with the same frequency. And when both the high frequency signal generating means are thus constituted to generate the high frequency signal with the same frequency, the original upward signal outputted by the terminal device can be restored by the down-converter.

In order that the high frequency signal generating means of the down-converter and of the up-converter can generate the high frequency signals with the same frequency, the high frequency signal generating means of each converter may be constituted from an oscillator (for example, a quartz oscillator) with small frequency deviation for generating the reference signal, a local oscillation circuit of frequency-variable type for generating the high frequency signal for frequency-conversion and a control circuit (for example, a PLL circuit) for controlling the oscillation frequency of the local oscillation circuit using the reference signal generated by the oscillator. The oscillator provided in each converter for generating the reference signal is preferably made to be the same constitution in this case. Alternatively, the high frequency signal generating means of each converter is constituted from a reference signal extracting circuit (for example, a band path filter) for extracting as a reference signal a signal with a constant frequency contained in the downward signal such as a pilot signal used for adjusting the downward signal level in the bidirectional CATV system, a local oscillation circuit of frequency-variable type for generating the high frequency signal for frequency-conversion and a control circuit (for example, a PLL circuit) for controlling the oscillation frequency of the local oscillation circuit using the reference signal extracted by the reference signal extracting circuit.

According to the above-mentioned constitution, there is a problem that an expensive oscillator such as the quartz oscillator should be provided in each converter as an oscillator for generating the reference signal, with the cost of each converter becoming high, or the frequency of the high frequency signal used for frequency-conversion in each converter can not be made to coincide with each other when the specific signal like a pilot signal is not transmitted from the external bi-directional CATV system. Therefore, the oscillator for generating the reference signal may be provided in the down-converter or on the transmission line in the in-building CATV system and the oscillation frequency of the local oscillation circuit in each converter may be controlled using the reference signal generated by the oscillator, by transmitting the reference signal to the transmission line from the oscillator.

Subsequently, the amplifier provided on the transmission line from the down-converter to the terminal at the subscriber side as one of the transmission devices in the in-building CATV system of the present invention transmits the downward signal transmitted from the down-converter to the transmission line at the terminal side via a downward signal path of the amplifier and transmits the in-building upward signal transmitted from the up-converter via the transmission line at the terminal side to the transmission line at the down-converter side via an in-building upward signal path. And at least on one of the downward signal path of the amplifier and the in-building upward signal path, a signal amplification means for amplifying the downward signal or the upward signal flowing through the path is provided.

And a trap circuit for removing the high frequency signal for frequency-conversion leaking out from the up-converter at the terminal side may be provided further on the in-building upward signal path in the amplifier of the present invention.

When the amplifier is constituted in such a way, at least one of the downward signal and the in-building upward signal can not only be amplified to a predetermined value on the transmission line in the in-building CATV system but also the high frequency signal for frequency-conversion leaking out from each up-converter at the terminal side can be attenuated. Then, the upward signal for being outputted to the bi-directional CATV system is normally restored from the in-building upward signal.

Also, an equalizer for compensating the transmission loss in the frequency band of the in-building upward signal occurring when the in-building upward signal is passed through the trap circuit may be provided on the in-building upward signal path in the amplifier of the present invention.

When the amplifier is constituted in such a way, at least one of downward signal and the in-building upward signal can not only be amplified to a predetermined value on the transmission line of the in-building CATV system but also the upward signal for being outputted to the bi-directional CATV system can be transmitted to the external bi-directional CATV system from the down-converter in the normal level in the whole frequency band, even if the signal level of the in-building upward signal in the frequency side near the high frequency signal for frequency-conversion is lowered due to the transmission loss occurring when the in-building upward signal is passed through the trap circuit.

Moreover, the up-converter in the in-building CATV system of the present invention may comprise a downward signal path for transmitting the downward signal inputted from the lead-in wire to the terminal device side, an upward signal path for transmitting the upward signal outputted from the terminal device to the lead-in wire side, a high frequency signal generating means for generating the high frequency signal for frequency-converting the upward signal from the terminal device to the in-building upward signal in a predetermined frequency band, a frequency-conversion means for frequency-converting the upward signal to the in-building upward signal by mixing the upward signal transmitted from the terminal device side on the upward signal path and the high frequency signal generated by the high frequency signal generating means and for transmitting the in-building upward signal to the lead-in wire side on the upward signal path and a high frequency signal removal means for mixing a leak-out high frequency signal leaking out and transmitted to the lead-in wire side on the upward signal path together with the in-building upward signal when the frequency-conversion means frequency-converts the upward signal with a phase-inverted high frequency signal whose phase is inverted against the high frequency signal generated by the high frequency signal generating means and for removing the leak-out high frequency signal from the upward signal path by offsetting the leak-out high frequency signal by the phase-inverted high frequency signal.

When the up-converter is constituted in such a way, since the high frequency signal leaking out to the upward signal path is removed and prevented from being inputted to the down-converter, the down-converter can correctly frequency-convert the in-building upward signal to the upward signal for being outputted to the bi-directional CATV system without being influenced by the high frequency signal for frequency-conversion leaking out to the upward signal path.

Therefore, when such an up-converter is used, there can be constituted an in-building CATV system in which the upward signal outputted from the subscriber terminal device is transmitted to the external bi-directional CATV system without aggravation of its quality.

In the up-converter of the present invention, the high frequency signal removal means may be constituted to generate the phase-inverted high frequency signal independently of the high frequency signal generating means (oscillator) for generating the high frequency signal for frequency-conversion. However, in such a case, a further oscillator has to be provided in the up-converter of the CATV system in addition to the high frequency signal generating means, thereby the number of parts being unpreferably increased.

Then, the high frequency signal removal means may comprise a high frequency signal branch means for branching the high frequency signal generated by the high frequency signal generating means and transmitted to the frequency-conversion means, and a phase-inverted high frequency signal mixing means for mixing the phase-inverted high frequency signal made by inverting the phase of the high frequency signal branched by the high frequency signal branch means with the high frequency signal transmitted via the upward signal path.

When the up-converter is constituted in such a way, the high frequency signal is removed by mixing the phase-inverted high frequency signal made by inverting the phase of the high frequency signal branched by the high frequency signal branch means with the high frequency signal transmitted via the upward signal path. And if the phase-inverted high frequency signal is thus made from the high frequency signal for frequency-conversion generated by the high frequency signal generating means, there is no need to provide additionally a means for generating the phase-inverted high frequency signal, that is, there is no need to increase the parts.

Furthermore, the high frequency signal removal means may comprise a level adjusting means for adjusting the level of the phase-inverted high frequency signal so that the level of the phase-inverted high frequency signal and that of the high frequency signal transmitted via the upward signal path becomes nearly the same.

When the up-converter is constituted in such a way, the high frequency signal transmitted via the upward signal path can be removed more surely, if the level of the phase-inverted high frequency signal is adjusted by the level adjusting means to make the levels of the high frequency signal and the phase-inverted high frequency signal nearly the same based on transmission loss of the upward signal path, temperature characteristic of the frequency-conversion means and the like.

BRIEF DESCRIPTION OF THE DRAWINGS

Hereinafter, various embodiment embodying the present invention will be described referring to the following drawings, in which.

DETAILED DESCRIPTION OF PREFERRED EMBODIMENTS

The First Embodiment

Figure 1:
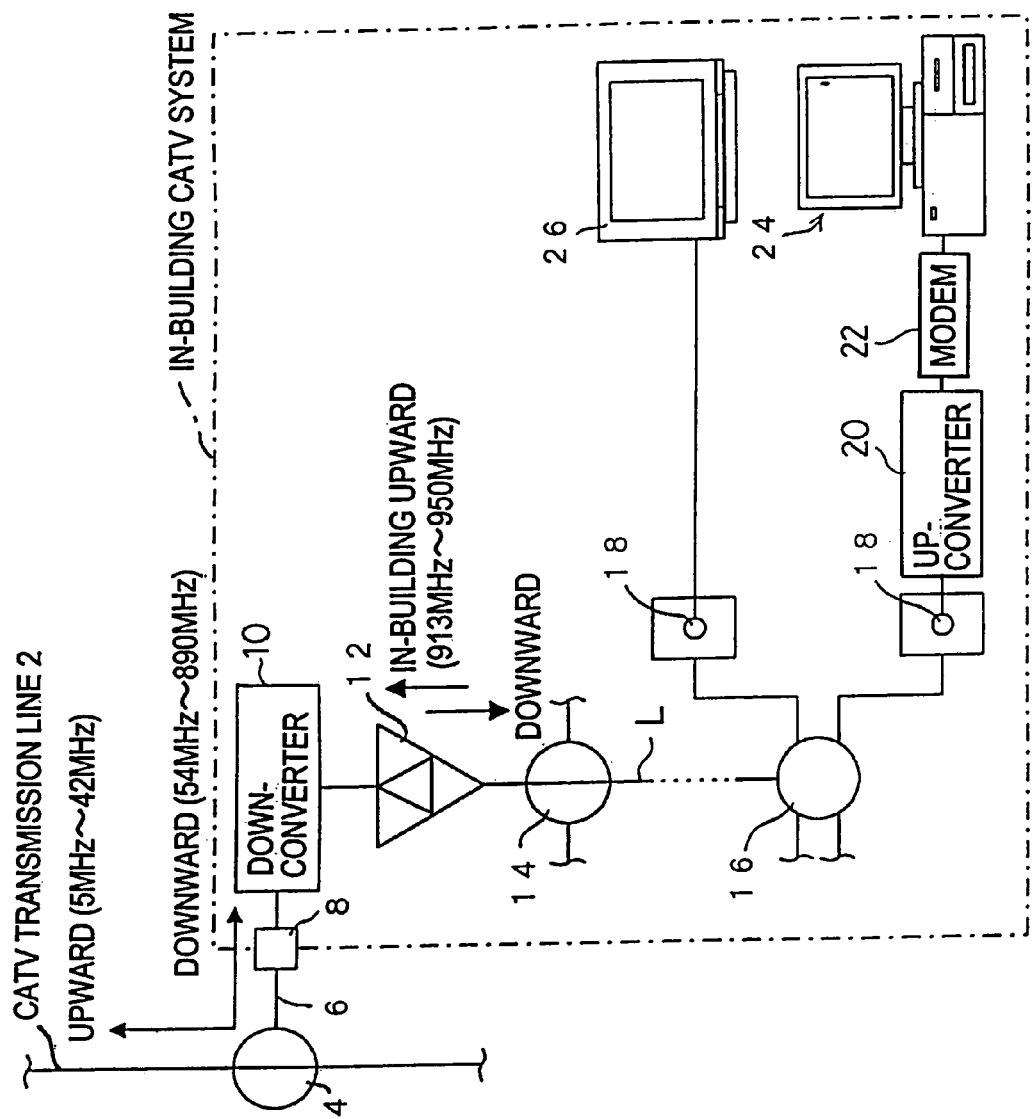
FIG. 1 is a schematic diagram showing the constitution of an in-building CATV system of a first embodiment of the present invention.

As shown in FIG. 1, in a in-building CATV system of the present embodiment, a lead-in wire 6 branched from a transmission line 2 (CATV transmission line) of an external bi-directional CATV system via a tap device 4 is lead in a building via a protector 8. A downward signal (frequency: 54 MHz–890 MHz) of the bi-directional CATV system inputted from the lead-in wire 6 is transmitted to plural terminals 18 comprising serial units and the like provided in the subscriber's houses in the building via a transmission line L made of a coaxial cable in the building, a bi-directional amplifier 12, a directional coupler 14, a splitter 16 and the like. Additionally an in-building upward signal inputted to the terminal 18 from each of various subscriber terminal devices via an up-converter 20 described hereinafter is transmitted to the lead-in wire 6.

And in the in-building CATV system of the present invention, when the subscriber enjoys the Internet via a center equipment of the external bi-directional CATV system or sends data for reserving a pay program of the TV or for TV-shopping and the like to the center equipment, an information terminal device 24 such as a personal computer for data communication is connected to the terminal 18 via the up-converter 20 and a cable modem 22.

As a result, a transmission data for data communication outputted from the information terminal device 24 is frequency-converted to an upward signal in a predetermined frequency band (in the present embodiment, 5 MHz–42 MHz) transmittable in the external bi-directional CATV system by the cable modem 22, and the upward signal is further frequency-converted to an in-building upward signal in a predetermined frequency band (in the present embodiment, 913 MHz–950 MHz) by the up-converter 20 to be inputted to the terminal 18.

Therefore, a down-converter 10 for frequency-converting the in-building upward signal transmitted from each terminal 18 via the transmission line L to the upward signal (in the present embodiment, the upward signal in the same frequency band as that of the original upward signal) transmittable in the external bi-directional CATV system is provided at a connecting part of the transmission line L of the in-building CATV system and the lead-in wire 6 from the external bi-directional CATV system.

In FIG. 1, numeral 26 denotes a television receiver which is connected to the terminal 18 that is not connected to the up-converter 20 and which receives the downward signal from the external bi-directional CATV system via the transmission line L to demodulate/reproduce a television broadcasting of a desired channel.

Subsequently, the constitutions of the down-converter 10 and the up-converter 20 used in the in-building CATV system of the present embodiment will be described referring to FIGS. 2A and 2B.

[Down-Converter]

Figure 2A:
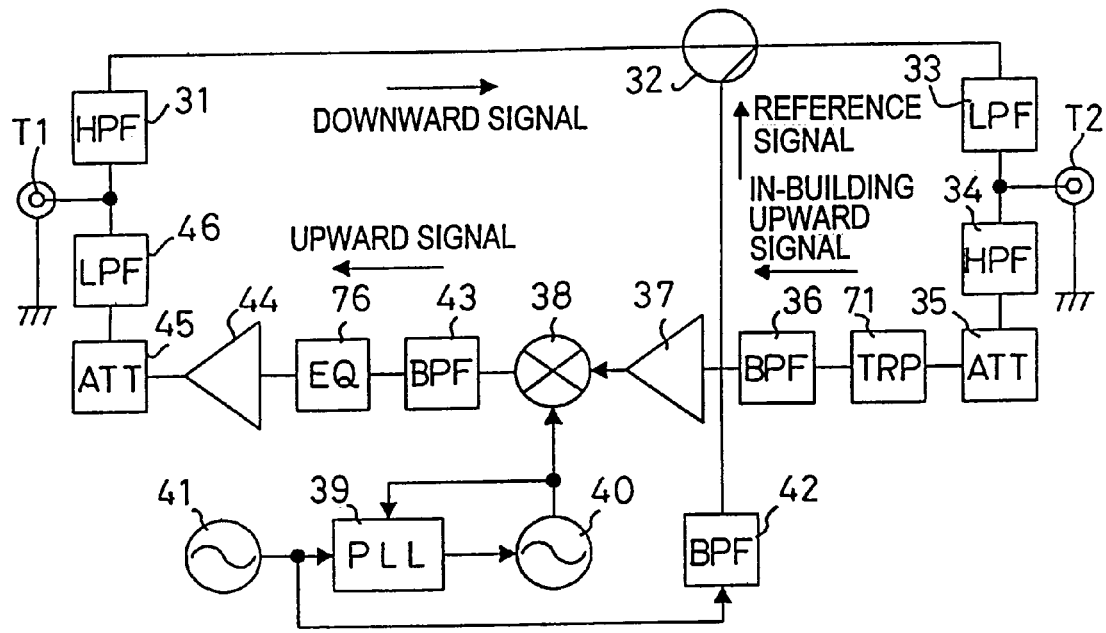
FIG. 2A is a block diagram showing a constitution of a down-converter of the first embodiment provided with a trap circuit.

As shown in FIG. 2A, the down-converter 10 is provided with an external connection terminal T1 for connecting the lead-in wire 6 from the external bi-directional CATV system and an internal connection terminal T2 for connecting the transmission line L in the building.

The downward signal inputted to the external connection terminal T1 is taken into the down-converter 10 via a high path filter (referred to as an HPF, hereinafter) 31 and transmitted to the transmission line L at the terminal side via a mixing circuit 32, a low path filter (referred to as an LPF, hereinafter) 33 and the internal connection terminal T2.

Here, the HPF 31 passes the downward signal and cuts off the frequency-converted upward signal. The cutoff frequency is set, for example, to 54 MHz. The LPF 33 passes the downward signal and cuts off the in-building upward signal inputted to the internal connection terminal T2 via the transmission line L. The cutoff frequency is set, for example, to 890 MHz. Therefore, in the down-converter 10 of the present embodiment, a downward signal path of the down-converter is formed by the HPF 31 and the LPF 33.

Moreover, the mixing circuit 32 provided on the downward signal path between the HPF 31 and the LPF 33 transmits a reference signal described hereinafter as well as the downward signal to the transmission line L at the terminal side by mixing the reference signal with the downward signal passed through this path and is comprised of a so-called directional coupler.

Subsequently, the in-building upward signal from the terminal side inputted to the internal connection terminal T2 is taken into the down-converter 10 via an HPF 34. The HPF 34 prevents the downward signal outputted by the LPF 33 from entering and selectively takes in only the in-building upward signal. Its cutoff frequency is set, for example, to 913 MHz.

And the in-building upward signal taken into the down-converter 10 is inputted to the amplification circuit 37 via an attenuator (referred to as an ATT, hereinafter) 35 and a band path filter (referred to as a BPF) 36. The BPF 36 selectively passes the in-building upward signal and the signal pass band is set to the transmission frequency band of the in-building upward signal (913 MHz–950 MHz).

The in-building upward signal inputted to the amplification circuit 37 is inputted to a mixer 38 as a frequency-conversion means of the down-converter after having been amplified to a predetermined level at the amplification circuit 37. And the mixer 38 frequency-converts the in-building upward signal to the original upward signal before frequency-converted by the up-converter 20 by mixing the in-building upward signal with the high frequency signal from a local oscillation circuit 40 of a frequency variable type controlled by a PLL circuit 39 so that the oscillation frequency is controlled to be a constant value (955 MHz in the present embodiment).

Here, the PLL circuit 39 takes in the high frequency signal outputted from the local oscillation circuit 40 and the reference signal after frequency-dividing each of the signals and controls the frequency of the high frequency signal for frequency-conversion in the down-converter 10 to be a constant frequency corresponding to the reference signal, by controlling the oscillation frequency of the local oscillation circuit 40 in such a way that the phase difference between the frequency-divided signals becomes zero. In the present embodiment, the reference signal used for controlling the oscillation frequency of the local oscillation circuit 40 by the PLL circuit 39 is contrived to be generated by a reference oscillation circuit 41 in the down-converter 10. Therefore, in the present embodiment, the PLL circuit 39, the local oscillation circuit 40 and the reference oscillation circuit 41 function as a high frequency signal generating means of the down-converter.

Moreover, the oscillation frequency of the reference oscillation circuit 41 is set to a frequency lower than that of the downward signal. The reference signal with a frequency lower than that of the downward signal is inputted not only to the PLL circuit 39 as mentioned above, but also to the above-mentioned mixing circuit 32 via a BPF 42 for selectively passing the reference signal. As a result, the reference signal is transmitted to the transmission line L via the LPF 33 and the internal connection terminal T2, after mixed with the downward signal in the mixing circuit 32 as mentioned above.

The purpose of thus sending the reference signal to the transmission line L from the internal connection terminal T2 is that it becomes possible that the high frequency signal for frequency-conversion is generated in each up-converter 20 using the same reference signal as that of the down-converter 10 by transmitting the reference signal to each up-converter 20 at the terminal side. Specifically, in the present embodiment, by transmitting the reference signal to each up-converter 20 at the terminal side from the down-converter 10, the frequency of the high frequency signal used for frequency-conversion by each up-converter 20 is made to coincide with that of the high frequency signal used for frequency-conversion by down-converter 10.

Subsequently, the upward signal frequenc-converted by the mixer 38 is inputted to an amplification circuit 44 for amplifying the upward signal via a BPF 43 whose signal pass band is set to the transmission frequency (5 MHz–42 MHz) of the upward signal to pass the upward signal selectively. The upward signal is sent to the lead-in wire 6 via an ATT 45 for adjusting the signal level, an LPF 46 and the external connection terminal T1, after having been amplified to a predetermined level by the amplification circuit 44. The LPF 46 is for cutting off the downward signal inputted to the external connection terminal T1 and for passing only the frequency-converted upward signal. Its cutoff frequency is set, for example, to 42 MHz.

Subsequently, in the down-converter 10 of the present embodiment, a trap circuit (referred to as a TRP, hereinafter) 71 for removing the high frequency signal for frequency-conversion in the up-converter 20 leaking out from each up-converter 20 at the terminal side and transmitted to the down-converter 10 via the transmission line L, is provided on the input path of the in-building upward signal from the internal connection terminal T2 to the mixer 38 (specifically, the path between the ATT 35 and the BPF 36).

Figure 3A:
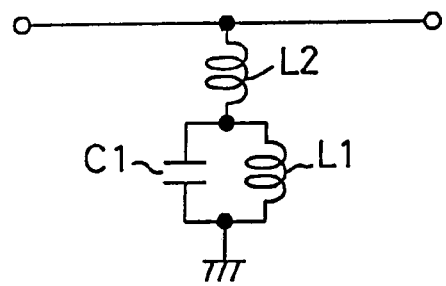
FIG. 3A is an explanatory diagram showing the constitution of a trap circuit.

As shown in FIG. 3A, the TRP 71 consists of a parallel resonance circuit consisting of a parallel circuit of a coil L1 and a capacitor C1, whose resonance frequency is set to a frequency lower than that of the high frequency signal for frequency-conversion, and a coil L2 (corresponding to an inductive reactance) which connects one end of the parallel resonance circuit to the in-building upward signal path and grounds another end to a ground with the same voltage as that of an outer conductor of a co-axial cable constituting the transmission line L.

And since the TRP 71 resonates in series in a frequency determined by the inductive reactance of the coil L2 and the capacity component of the parallel resonance circuit, the high frequency signal for frequency-conversion flowing through the in-building upward signal path is made to be removed by making the frequency of the series resonance coincide with the frequency of the high frequency signal for frequency-conversion.

Figure 3B:
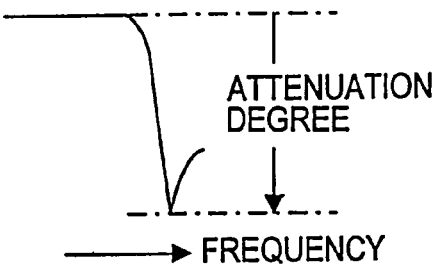
FIG. 3B is an explanatory chart showing its frequency characteristic.

As mentioned above, in the present embodiment, there is used as the TRP 71 a so-called trap circuit of an L coupling type in which the parallel resonance circuit consisting of the coil L1 and the capacitor C1 is connected to the in-building signal path via the coil L2. This is because in such a trap circuit of an L coupling type, as shown in FIG. 3B of the frequency characteristic of the trap circuit, the drop of the attenuation degree becomes sharp in the frequency range lower than the frequency of the signal to be removed (in the figure, the resonance frequency at which the attenuation degree becomes a maximum) and so the influence to the in-building upward signal with the frequency lower than the resonance frequency can be decreased.

Furthermore, in the down-converter 10 of the present embodiment, an equalizer (referred to as an EQ, hereinafter) 76 is provided on the output path of the upward signal from the mixer 38 to the external connection terminal T1 (in more detail, between the BPF 43 and the amplification circuit 44). The EQ 76 is for compensating the transmission loss in the frequency band of the in-building upward signal occurred when the in-building upward signal is passed through the TRP 71 and is constituted, for example, in a manner shown in FIG. 4A.

Figure 4A:
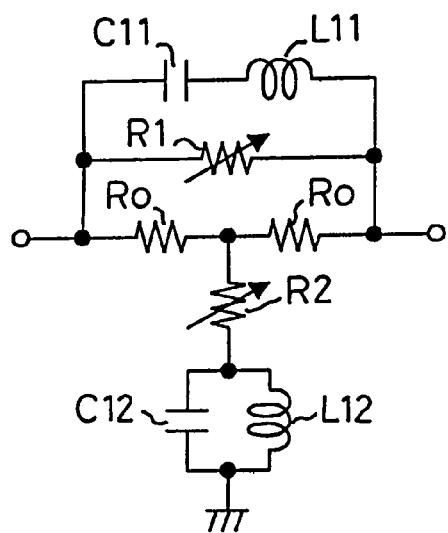
FIG. 4A is an explanatory diagram showing the constitution of an equalizer.

Specifically, as shown in FIG. 4A, the EQ 76 consists of a pair of resistors Ro with the same resistance value connected in series to the upward signal path, a resistor R1 connected in parallel with a series circuit of the two resistors Ro, a series resonance circuit consisting of a capacitor C11 and a coil L11 connected as well in parallel with the series circuit of the two resistors Ro, a resistor R2 of which one end is connected to a connecting point of the two resistors Ro and a parallel resonance circuit consisting of a capacitor C12 and a coil L12 provided between the other end of the resistor R2 and a ground.

The EQ 76 is of a known type in which the pair of the resistors Ro, the resistors R1 and R2 are made to function as an attenuation circuit with a constant attenuation degree by setting the resistance value of the pair of the resistors Ro to a value (for example, 75 Ω) corresponding to the transmission impedance of the signal in the system and by setting the resistance values of the resistors R1 and R2 to appropriate values, and the capacities of the capacitors C11 and C12 and the inductances of the coils L11 and L12 are set to values such that [$\omega$ L11=1/$\omega$C12] and [$\omega$L12=1/$\omega$C11].

Figure 4B:
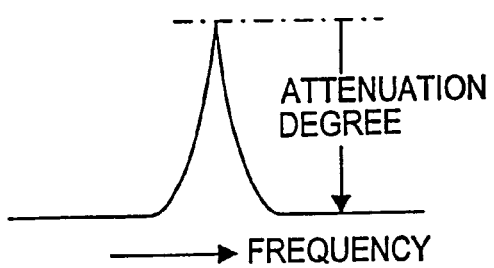
FIG. 4B is an explanatory chart showing its frequency characteristic.

Therefore, in the EQ 76, as shown in FIG. 4B, the impedance values of the series resonance circuit and the parallel resonance circuit becomes "0" and "a maximum", respectively, to a signal with a specific frequency and the signal can be passed without loss. To a signal with a frequency other than that of the above-mentioned signal, the impedance values of the series resonance circuit and the parallel resonance circuit becomes "a maximum" and "0", respectively, and the signal can be passed after having been attenuated by a constant attenuation degree determined by the attenuation characteristic of the attenuation circuit.

In the present embodiment, the attenuation degree by the attenuation circuit is designed to be adjusted by using variable resistors as the resistors R1 and R2. Specifically, when the resistor Ro is set to 75 Ω corresponding to the transmission impedance of the signal in the system, the EQ 76 of the present embodiment becomes an attenuation circuit with attenuation degree of 6 dB if the resistance values of the resistors R1 and R2 are set, for example, to the same value 75 Ω and it becomes an attenuation circuit with attenuation degree of 3 dB if R1=32.5 Ω and R2=150 Ω. However, since the EQ 76 is for compensating the transmission loss in the frequency band of the in-building upward signal occurring when the in-building upward signal is passed through the TRP 71, the frequency characteristic of the EQ 76 is designed to be finely adjusted in response to the frequency characteristic of the TRP 71.

Moreover, the frequency of the signal at which the impedance of the above-mentioned series resonance circuit becomes "0" is set to the frequency of frequency-converted signal corresponding to the maximum frequency of the in-building upward signal, 950 MHz (that is, the minimum frequency of the upward signal, 5 MHz).

Figure 5:
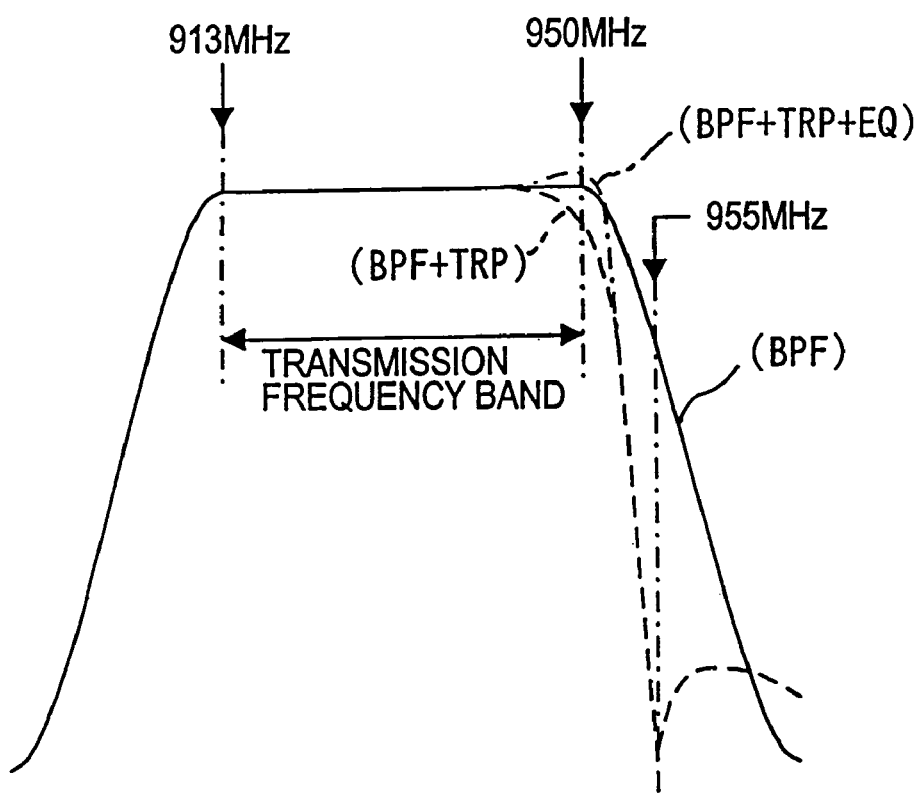
FIG. 5 is an explanatory chart showing the action of the trap circuit and the equalizer.

Specifically, since the high frequency signal (a signal with a frequency of 955 MHz) for frequency-conversion transmitted from the terminal side together with the in-building upward signal can not be fully removed by providing only the BPF 36 on the in-building upward signal path in the down-converter 10 of the present embodiment, as shown by a solid line (BPF) in FIG. 5, the TRP 71 for removing the high frequency signal is provided on the in-building upward signal path. But when the TRP 71 is constituted as a usual trap circuit shown in FIG. 3A, the attenuation characteristic can not be made to be sharp in the frequency side lower than the resonance frequency of the TRP 71 and the in-building upward signal is attenuated in the high frequency side of its transmission frequency band, as shown by a dotted line (BPF+TRP) in FIG. 5.

Then, in the present embodiment, as shown by the dotted chain lines (BPF+TRP+EQ) in FIG. 5, the EQ 76 is provided on the path of the frequency-converted upward signal to compensate a drop of the signal level in the high frequency side (950 MHz side) of the in-building upward signal at the TRP 71.

Therefore, in the EQ 76, in order to heighten the level of a signal in the low frequency side of the upward signal (5 MHz side) corresponding to the high frequency side of the in-building upward signal (950 MHz), the frequency of a signal which can be passed without being attenuated as a result that the impedance of the above-mentioned series resonance circuit becomes "0" is set to the minimum frequency of 5 MHz of the frequency-converted upward signal corresponding to the maximum frequency of 950 MHz of the in-building upward signal.

[Up-Converter]

Figure 2B:
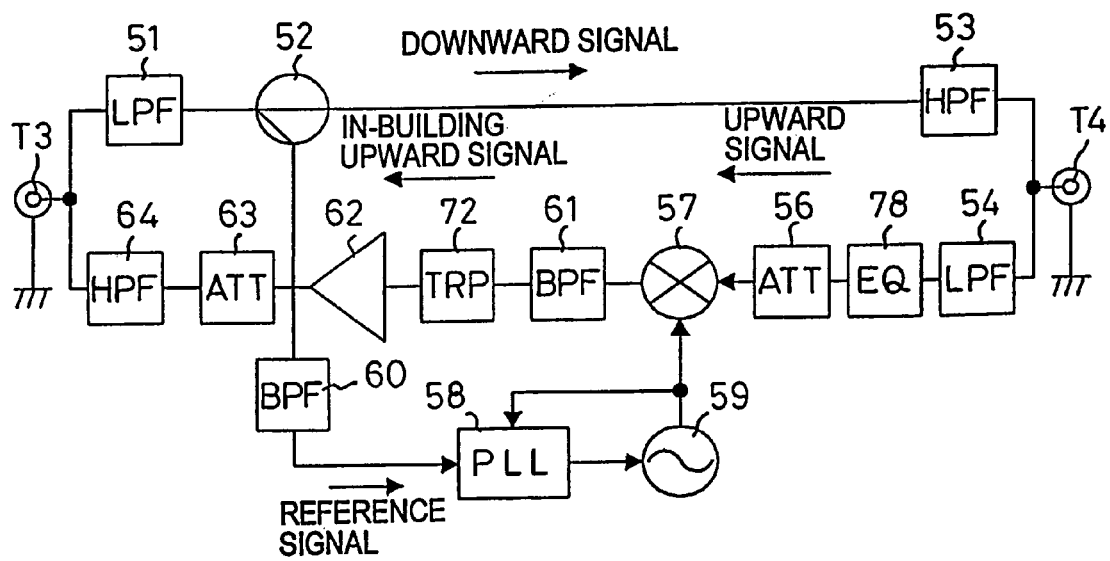
FIG. 2B is a block diagram showing the constitution of an up-converter of the first embodiment provided with a trap circuit.

As shown in FIG. 2B, the up-converter 20 is provided with a first connection terminal T3 for connecting to the terminal 18 via the co-axial cable and the like and a second connection terminal T4 for connecting to a terminal device for communication like the cable modem 22 and the like which outputs the upward signal.

And the downward signal inputted to the first connection terminal T3 from the terminal 18 is taken in the up-converter 20 via an LPF 51 and transmitted to the terminal device side via a branch circuit 52, an HPF 53 and the second connection terminal T4.

Here, the LPF 51 cuts off the frequency-converted in-building upward signal and passes only the downward signal inputted to the first connection terminal T3. Its cutoff frequency is set, for example, to 890 MHz. The HPF 53 cuts off the upward signal inputted to the second connection terminal T4 from the terminal device for communication and passes only the downward signal. Its cutoff frequency is set, for example, to 54 MHz. Therefore, in the up-converter 20 of the present embodiment, a downward signal path of the up-converter is constituted by the LPF 51 and the HPF 53.

Moreover, the branch circuit 52 provided on the downward signal path between the LPF 51 and the HPF 53 branches a part of the downward signal passed through the path and comprised of a so-called directional coupler. The downward signal branched by the branch circuit 52 is inputted to a BPF 60 with a narrow frequency band for extracting the reference signal transmitted from the down-converter 10.

Subsequently, the upward signal inputted to the second connection terminal T4 from the terminal device for communication is taken in the up-converter 20 via an LPF 54. The LPF 54 prevents the downward signal outputted by the HPF 53 from entering and selectively takes in only the upward signal. Its cutoff frequency is set, for example, to 42 MHz.

And the upward signal taken into the up-converter 20 via the LPF 54 is inputted to a mixer 57 as a frequency-conversion means of the up-converter via an ATT 56 for adjusting the signal level. Then, the mixer 57 frequency-converts the upward signal to the in-building upward signal by mixing the upward signal with the high frequency signal from a local oscillation circuit 59 of a frequency variable type whose oscillation frequency is controlled to be a constant frequency (in the present embodiment, 955 MHz) by a PLL circuit 58.

Here, the PLL circuit 58 takes in the reference signal extracted at the BPF 60 (that is, the reference signal transmitted from the down-converter 10) and the high frequency signal for frequency-conversion outputted from the local oscillation circuit 59 after frequency-dividing each of the signals and controls the frequency of the high frequency signal for frequency-conversion in the up-converter 20 to be the same frequency as that of the high frequency signal for frequency-conversion in the down-converter 10, by controlling the oscillation frequency of the local oscillation circuit 59 in such a way that the phase difference between the frequency-divided signals becomes zero. Therefore, in the present embodiment, the branch circuit 52, the BPF 60, the PLL circuit 58 and the local oscillation circuit 59 function as a high frequency signal generating means of the up-converter of the present embodiment.

Subsequently, the in-building upward signal frequency-converted by the mixer 57 is inputted to an amplification circuit 62 for amplifying the in-building upward signal via a BPF 61 whose signal pass band is set to the transmission frequency band of the in-building upward signal (913 MHz–950 MHz) in order to pass the in-building upward signal selectively. And the in-building upward signal is transmitted to the terminal 18 (and further to the transmission line L) via an ATT 63 for adjusting signal level, an HPF 64 and the first connection terminal T3 after having been amplified to a predetermined level by the amplification circuit 62. Here, the HPF 64 cuts off the downward signal inputted to the first connection terminal T3 and passes only the in-building upward signal frequency-converted. Its cutoff frequency is set, for example, to 913 MHz.

Furthermore, in the up-converter 20 of the present embodiment, on the output path of the in-building upward signal from the mixer 57 to the first connection terminal T3 (in more detail, on the pass between the BPF 61 and the amplification circuit 62), a trap circuit (TRP) 72 for removing the high frequency signal is provided in order to prevent the high frequency signal for frequency-conversion outputted from the local oscillation circuit 59 from being passed through the output path of the in-building upward signal and transmitted to the transmission line L. The TRP 72 is constituted in a manner shown in FIG. 3A like the TRP 71.

Furthermore, in the up-converter 20 of the present embodiment, an EQ 78 for compensating the transmission loss in the frequency band of the in-building upward signal occurring when the frequency-converted in-building upward signal is passed through the TRP 72 is provided on the input path of the upward signal from the second connection terminal T4 to the mixer 57 (in more detail, on the path between the LPF 54 and the ATT 56). The EQ 78 is constituted in a manner shown in FIG. 4A, like the EQ 76 provided in the down-converter 10.

As mentioned above, in the in-building CATV system of the present embodiment, the trap circuits (TRP) 71 and 72 for removing the high frequency signal used in the up-converter 20 for frequency-conversion are provided in the down-converter 10 and the up-converter 20, respectively, by which the upward signal from the terminal device 24 with a frequency lower than that of the downward signal is frequency-converted to the in-building upward signal with a frequency higher than that of the downward signal and is transmitted upward on the transmission line L in the building.

As a result, the high frequency signal for frequency-conversion can be prevented from being transmitted to the transmission line L from the up-converter 20 connected to the terminal 18 and the high frequency signal for frequency-conversion leaking out from each up-converter 20 can be prevented from being overlapped and inputted to the mixer 38 in the down-converter 10.

Therefore, according to the present embodiment, it can be prevented from occurring that the above-mentioned phase noise generated when the high frequency signal for frequency-conversion leaking out from the up-converter 20 connected to the terminal 18 to the transmission line L is overlapped on the transmission line L is added to the upward signal after having been frequency-converted by the down-converter 10 and transmitted to the external bi-directional CATV system.

Furthermore, in the in-building CATV system of the present embodiment, the EQ 76 and the EQ 78 are provided on the output path of the upward signal in the down-converter 10 and on the input path of the upward signal in the up-converter 20, respectively, to compensate the transmission loss in the frequency band of the in-building upward signal occurring when the in-building upward signal is passed through the TRP 71 and the TRP 72.

As a result, according to the in-building CATV system of the present embodiment, the signal level in the low frequency side of the upward signal transmitted to the external bi-directional CATV system from the down-converter 10 can be prevented from being lowered even though the in-building upward signal is passed through the trap circuits (the TRP 71 and the TRP 72) in the in-building CATV system.

Therefore, according to the in-building CATV system of the present embodiment, the original upward signal can be correctly restored from the in-building upward signal in the down-converter 10 and transmitted to the external bi-directional CATV system without deteriorating the quality of the upward signal.

Particularly in the present embodiment, since the EQ 76 and the EQ 78 are provided not on the path of the in-building upward signal but on the path of the upward signal whose frequency is lower than that of the in-building upward signal to correct the transmission characteristic of the upward signal, the operation frequency of the EQ 76 and the EQ 78 can be set to a lower value and so their designing and manufacturing can be easily carried out compared with a case in which the EQ 76 and the EQ 78 are provided on the path of the in-building upward signal to correct the transmission characteristic of the in-building upward signal.

Though in the above-mentioned embodiment, it was described that the trap circuits were provided in both of the down-converter 10 and the up-converter 20, the trap circuit may be provided in other transmission device provided on the transmission line L (specifically, the bi-directional amplifier 12, directional coupler 14, splitter 16 and the like).

In the following, as a modification example of the first embodiment, a case in which the trap circuit is provided in the bi-directional amplifier 12 will be described.

Figure 6:
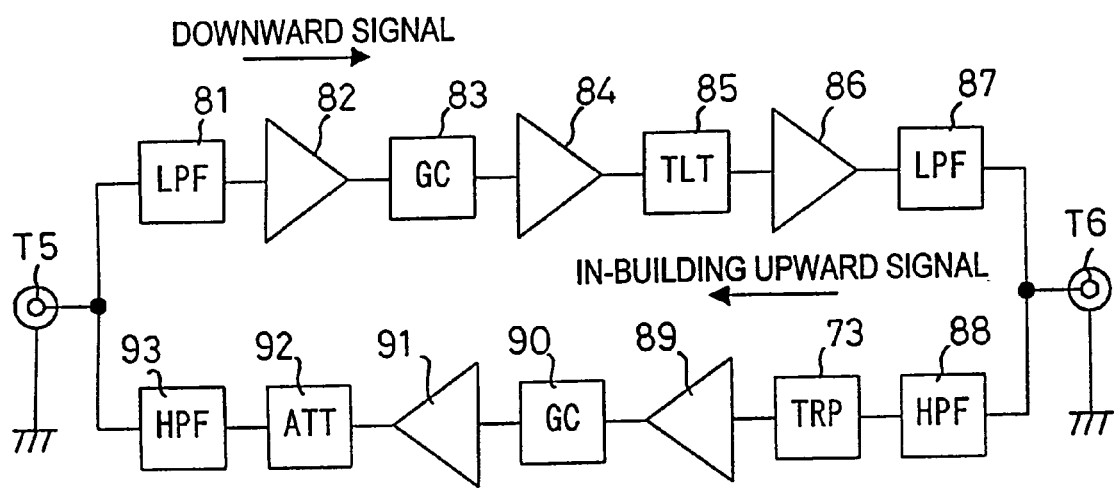
FIG. 6 is a block diagram showing the constitution of a bi-directional amplifier of a modified example of the first embodiment provided with a trap circuit.

The bi-directional amplifier 12 is provided with an input terminal T5 for being connected to the internal connection terminal T2 of the down-converter 10 via the transmission line L and a output terminal T6 for being connected to the transmission line L at the terminal side than the bi-directional amplifier 12, as shown in FIG. 6.

And the downward signal inputted to the input terminal T5 from the internal connection terminal T2 via the transmission line L is taken in the bi-directional amplifier 12 via an LPF 81. The downward signal passed through the LPF 81 is amplified to a predetermined level by being passed through an amplification circuit 82 and a gain adjusting circuit (referred to as a GC, hereinafter) 83 of the input stage, an amplification circuit 84 and a tilt circuit (referred to as a TLT, hereinafter) 85 of the middle stage and an amplification circuit 86 of the output stage one after another. Subsequently, the signal is transmitted to the transmission line L via an LPF 87 and the output terminal T6.

The LPF 81 and the LPF 87 cut off the in-building upward signal and passes only the downward signal. Their cutoff frequencies are set, for example, to 890 MHz, respectively. Therefore, in the bi-directional amplifier 12, the downward signal path of the amplifier is formed by the two LPFs 81 and 87.

Furthermore, the GC 83 provided on the downward signal path of the amplifier together with the three amplification circuits 82, 84 and 86 automatically adjusts the total amplification ratio of the downward signal amplification system by adjusting the degree of the built-in variable attenuator so that the level of the downward signal outputted from the amplification circuit 86 of the output stage becomes a predetermined level. And the TLT 85 adjusts the level of the downward signal outputted from the output terminal T6 so that the higher the frequency is, the higher the signal level becomes, corresponding to the attenuation characteristic of the downward signal on the transmission line L.

On the other hand, the in-building upward signal inputted to the output terminal T6 from the transmission line L is taken into the bi-directional amplifier 12 via an HPF 88. The in-building upward signal passed through the HPF 88 is amplified to a predetermined level by being passed through an amplification circuit 89 and a GC 90 of the input stage, an amplification circuit 91 and an ATT 92 of the output stage one after another and transmitted to the transmission line L of the down-converter 10 side via an HPF 93 and the input terminal T5.

The HPF 88 and the HPF 93 cut off the downward signal and passes only the in-building upward signal, respectively. Their cutoff frequencies are set, for example, to 913 MHz, respectively. Therefore, in the bi-directional amplifier 12 of the present embodiment, the in-building upward signal path is formed by the two HPFs 88 and 93. And in the bi-directional amplifier 12 of the present embodiment, the two amplification circuits 89 and 91 provided on the in-building upward signal path formed by the HPFs 88 and 93 function as an in-building upward signal amplification means.

And on the in-building upward signal path thus formed by the HPFs 88 and 93 (in more detail, on the path between the HPF 88 and the amplification circuit 89 of the input stage), a trap circuit (TRP) 73 for removing the high frequency signal for frequency-conversion leaking out from the up-converter 20 of the terminal side to the transmission line L before being amplified by the amplification circuit 89 of the input stage. The TRP 73 is constituted in a manner shown in FIG. 3A, like the TRPs 71 and 72.

In the thus constituted bi-directional amplifier 12 of the present embodiment, the downward signal and the in-building upward signal can be amplified to predetermined levels, respectively and the high frequency signal for frequency-conversion leaking out from each up-converter 20 of the terminal side can be removed (lowered).

Therefore, the high frequency signal for frequency-conversion leaking out from each up-converter 20 of the terminal side can be lowered on the transmission line L and the down-converter 10 can be made to correctly restore the original upward signal from the in-building upward signal.

Moreover, when the in-building CATV system is constituted using the down-converter 10 shown in FIG. 2A, the up-converter 20 shown in FIG. 2B and the bi-directional amplifier 12 shown in FIG. 6, the overlapped signal of the high frequency signal for frequency-conversion leaking out from each up-converter 20 can be more surely prevented from being transmitted to the mixer in the down-converter 10.

When the TRP 73 is provided in the bi-directional amplifier 12 as mentioned above, an equalizer for compensating the transmission loss in the frequency band of the in-building upward signal occurring when the in-building upward signal is passed through the TRP 73 may be provided on the in-building upward signal path. In this case, a device with the same constitution as that of the EQ 76 or 78 provided in the down-converter 10 or the up-converter 20 shown in FIG. 2A or 2B, respectively, may be used as the equalizer. However, since only the in-building upward signal is passed in the bi-directional amplifier 12, it is necessary that the operating frequency of the equalizer is set to a frequency of the high frequency side of the in-building upward signal (950 MHz).

Figure 7:
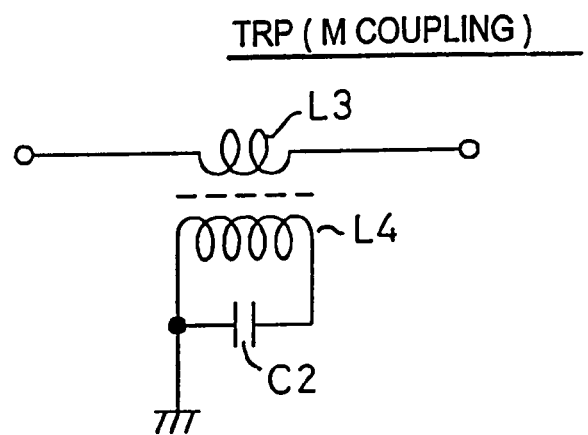
FIG. 7 is an explanatory diagram showing the constitution of a trap circuit (M coupling)

In the above-mentioned embodiment, it was explained that the circuit shown in FIG. 3A was used as the trap circuit (TRP) 71, 72. However, for example, as shown in FIG. 7, the trap circuit is constituted by connecting a coil L3 in series to the in-building upward signal path, connecting a coil L4 to the coil L3 via a magnetic material like ferrite and the like by mutual induction (M coupling), connecting a capacitor C2 to the coil L4 in parallel and grounding its one end.

Since a parallel resonance circuit is constituted by the coil L4 and the capacitor C2 connected with each other in parallel when the trap circuit of a M coupling type is constituted in such a way, the high frequency signal for frequency-conversion induced in the coil L4 via the coil L3 can be effectively removed if the resonance frequency of the parallel resonance circuit is set to the frequency of the high frequency signal for frequency-conversion.

However, in order to constitute the trap circuit in such a way, a transformer in which the coils L3 and L4 are wound on a common ferrite core should be used and so the size of the trap circuit becomes big compared with that of the trap circuit in FIG. 3A. As a result, when such a trap circuit is built in the down-converter 10 or the up-converter 20, it is freared that the size of these converters becomes big. Therefore, the trap circuit shown in FIG. 7 is preferably built, for example, in some housing and constituted as a device for dedicated use connected in series to the transmission line.

Subsequently, a high frequency signal with a frequency lower than that of the in-building upward signal (specifically, a signal with the frequency of 908 MHz) can also be used as the high frequency signal for frequency-conversion, though in the above embodiment, it was explained that a high frequency signal with a frequency higher than that of the in-building upward signal was used as the high frequency signal for frequency-conversion.

In this case, since it is necessary that the high frequency signal with the frequency lower than that of the in-building upward signal is removed by the trap circuit (TRP), it is preferable that the drop of the attenuation degree becomes sharp in the higher frequency side than the frequency of the signal to be removed (in other words, the resonance frequency where the attenuation degree becomes a maximum) and the influence to the in-building upward signal whose frequency is higher than the resonance frequency can be minimized.

Figure 8A:
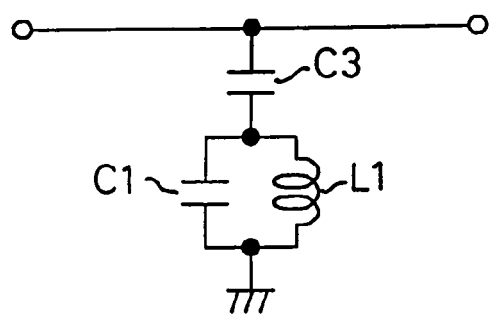
FIG. 8A is an explanatory diagram showing the constitution of a trap circuit (C coupling)
Figure 8B:
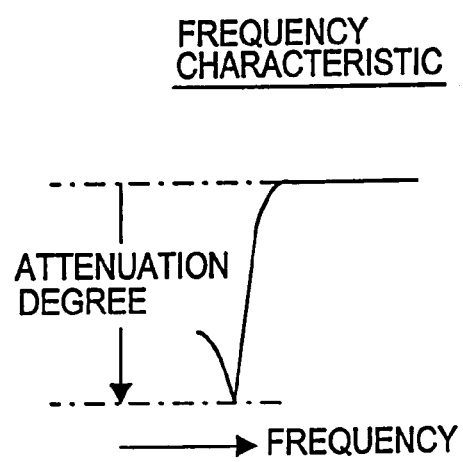
FIG. 8B is an explanatory chart showing its frequency characteristic.

And for this purpose, for example, a so-called C coupling trap circuit shown in FIG. 8A may be used as the trap circuit. In the C coupling trap circuit, the parallel resonance circuit consisting of a coil L1 and a capacitor C1 is connected to the in-building upward signal path via a capacitor C3 (corresponds to a capacitive reactance). This is because the frequency characteristic of the trap circuit of the C connection type is, as shown in FIG. 8B, such that the drop of the attenuation degree becomes sharp in the higher frequency side than the frequency of the signal to be removed (in the figure, the resonance frequency at which the attenuation degree becomes maximum).

The Second Embodiment

The second embodiment of the present invention will be described in the following, referring to the drawings:

The description about the same constituents as those of the above-mentioned first embodiment will be omitted or simplified.

Figure 9:
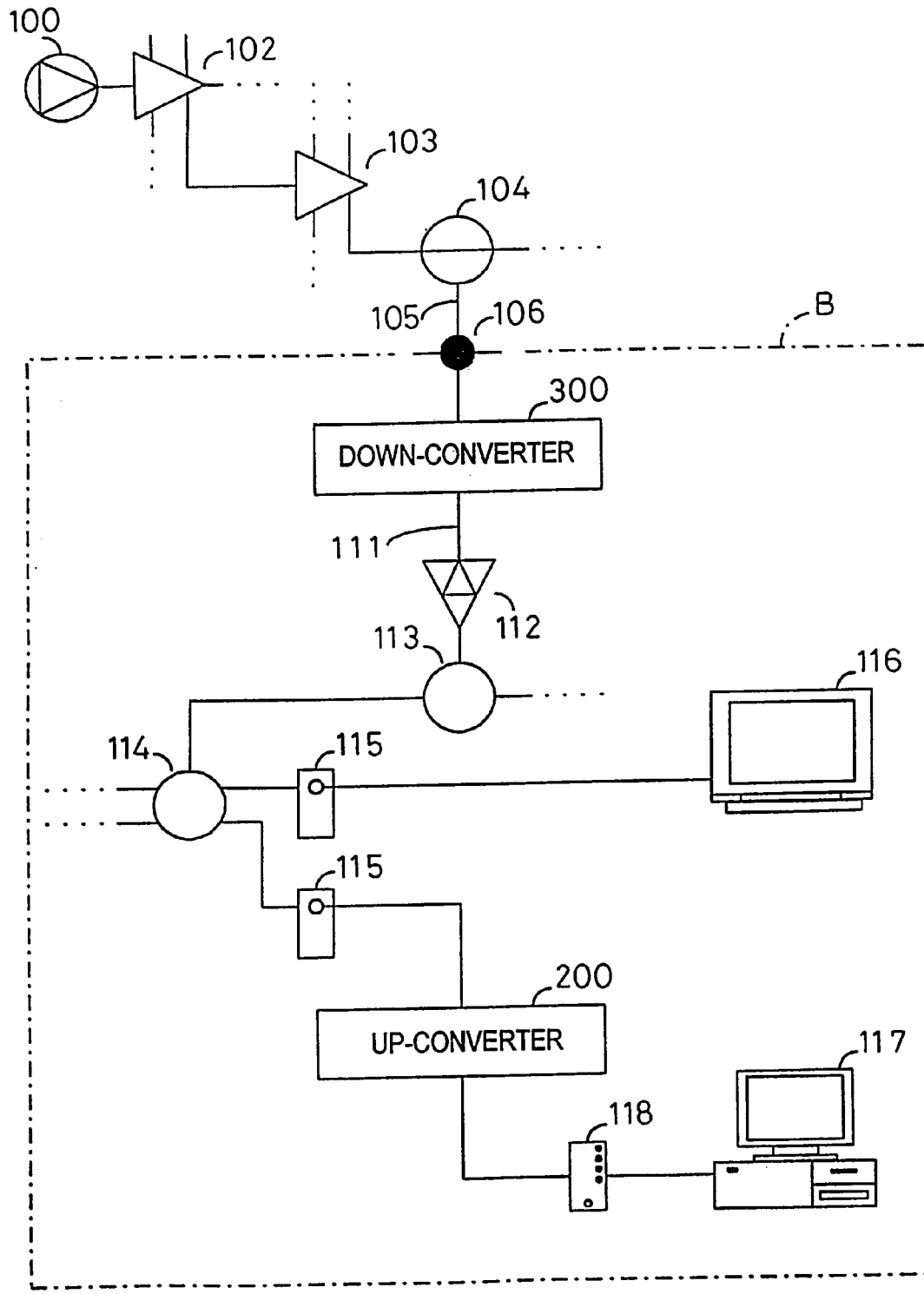
FIG. 9 is a block diagram showing the whole constitution of an in-building CATV system of the second embodiment.

As shown in FIG. 9, in an in-building CATV system of the present embodiment, a lead-in wire 105 branched from a tap off 104 of an external bi-directional CATV system constituted from a head end 100, a branch amplifier 102, an extension amplifier 103, the tap off 104 and the like is led into a building B such as a collective residence via a protector 106. A downward signal from the external bi-directional CATV system (the frequency: 54–890 MHz) inputted from the lead-in wire 105 is transmitted to plural subscribers' terminals 115 in the building B via a transmission line 111 in the building B, and a bi-directional amplifier 112, a 2-way-splitter 113, a 4-way-splitter 114 and the like provided on the transmission line 111. Additionally an upward signal (in-building up-ward signal) inputted from the terminal 115 is transmitted to the lead-in wire 105.

And when the downward signal transmitted via the transmission line 111 is received by the television receiver 116, the television receiver 116 demodulates the downward signal and outputs voice and image.

In the in-building CATV system of the present embodiment, a personal computer (terminal device) 117 is connected to the terminal 115 via a cable modem 118 and reserving of watching a pay program, shopping on the television can be done by transmitting various data to the head end 100 from the personal computer 117. In more detail, the various data generated in the personal computer 117 are frequency-converted in the cable modem 118 to the upward signal in a frequency band transmittable in the external bi-directional CATV system (in the present embodiment, from 5 to 42 MHz) and inputted to the terminal 115.

An up-converter 200 is provided between the terminal 115 and the cable modem 118. The upward signal transmitted from the personal computer 117 via the cable modem 118 is frequency-converted to the in-building upward signal in a frequency band higher than that of the downward signal in the up-converter 200 and then inputted to the terminal 115.

And corresponding to the up-converter 200, there is provided a down-converter 300 for restoring the original upward signal with a frequency usable in the external bi-directional CATV system from the in-building upward signal transmitted from the terminal 115 via the transmission line 111 at the connecting part of the transmission line 111 of the in-building CATV system and the lead-in wire 105 of the external bi-directional CATV system.

Figure 10:
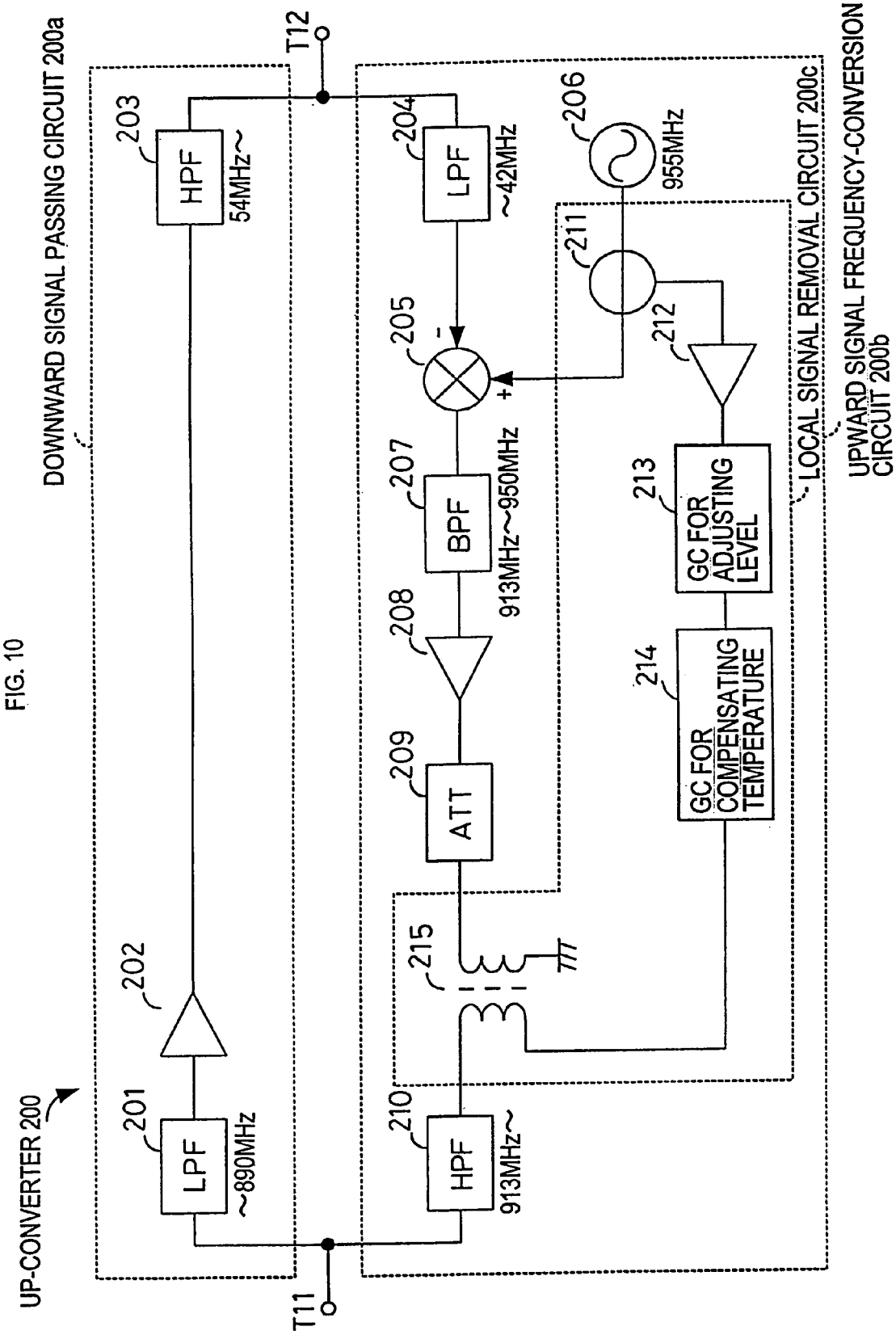
FIG. 10 is a block diagram showing the constitution of an up-converter of the second embodiment.

As shown in FIG. 10, the up-converter 200 is provided with a downward signal passing circuit 200a, an upward signal frequency-conversion circuit 200b, a first connection terminal T11 and a second connection terminal T12.

The downward signal passing circuit 200a is constituted from an LPF 201 for cutting off the in-building upward signal, a unilateral amplifier 202 and an HPF 203 for cutting off the upward signal. The upward signal frequency-conversion circuit 200b is constituted from an 204 for cutting off the downward signal, a mixer 205, a local signal oscillator 206, a BPF 207, a unilateral amplifier 208, an ATT 209 and an HPF 210 for cutting off the downward signal.

The frequency band of the LPF 201 for passing signal is equal to or lower than 890 MHz, the frequency band of the HPF 203 for passing signal is equal to or higher than 54 MHz, the frequency band of the LPF 204 for passing signal is equal to or lower than 42 MHz, the oscillation frequency of the local signal oscillator 206 is 955 MHz, the frequency band of the BPF 207 for passing signal is 913–950 MHz and the frequency band of the HPF 210 for passing signal is equal to or higher than 913 MHz.

The unilateral amplifier 202 is for compensating the loss of the downward signal when the signal is passed through the LPF 201, HPF 203 and the like and the unilateral amplifier 208 is for compensating the loss of the upward signal and the in-building upward signal occurring when the signal is passed through the LPF 204, the BPF 207, the HPF 210 and the like.

And the downward signal with a frequency from 54 MHz to 890 MHz inputted from the first connection terminal T11 is outputted from the second connection terminal T12 via the LPF 201, the unilateral amplifier 202 and the HPF 203. On the other hand, the upward signal with a frequency from 5 to 42 MHz inputted from the second connection terminal T12 is inputted to the mixer 205 via the LPF 204. The mixer 205 frequency-converts the upward signal to the in-building upward signal with a frequency from 913 MHz to 950 MHz using a local signal of 955 MHz inputted from the local signal oscillator 206. Then, the in-building upward signal is outputted from the first connection terminal T11 via the BPF 207, the unilateral amplifier 208, the ATT 209 and the HPF 210.

Figure 11:
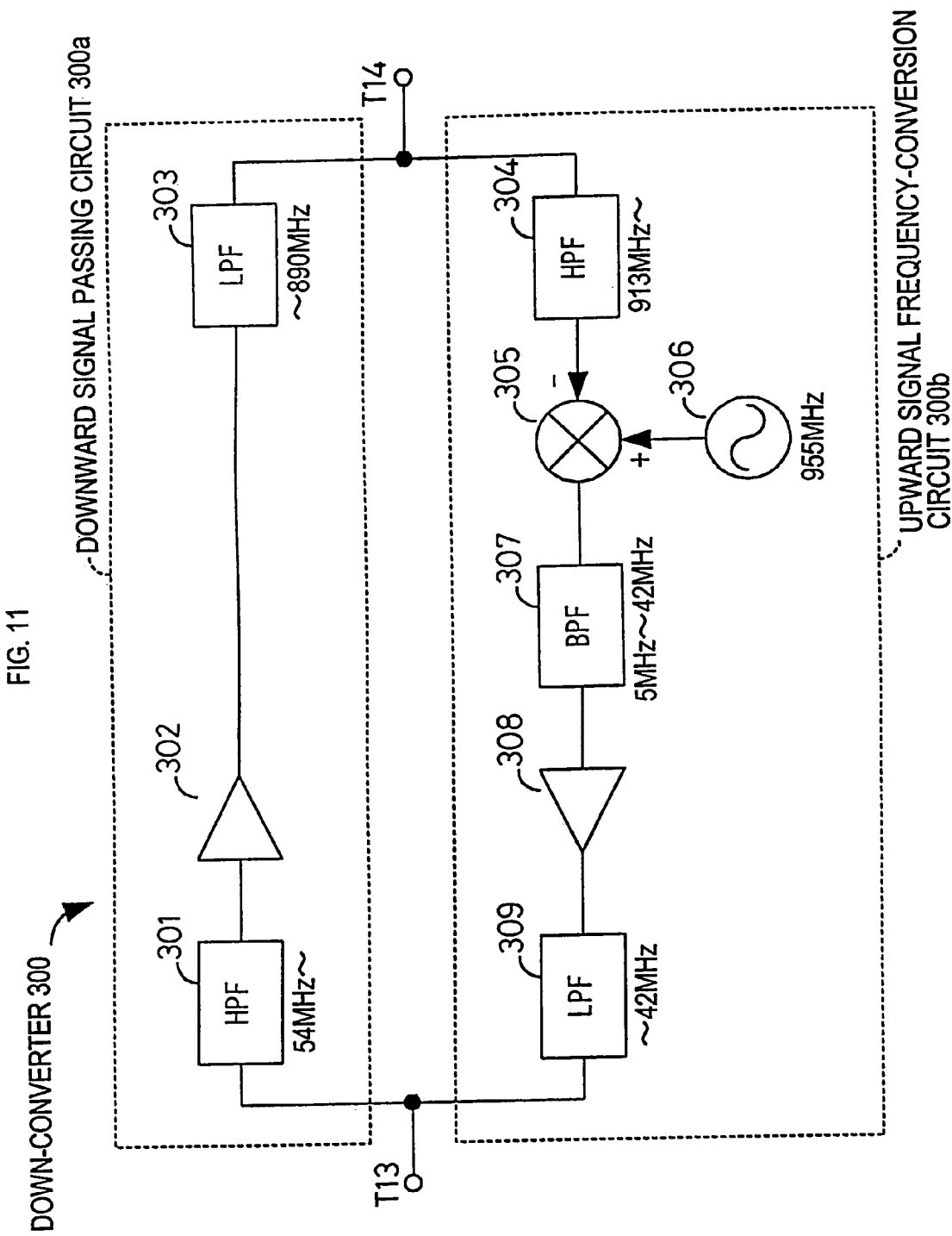
FIG. 11 is a block diagram showing the constitution of a down-converter of the second embodiment.

As shown in FIG. 11, the down-converter 300 is provided with a downward signal passing circuit 300a, an upward signal frequency-conversion circuit 300b, an external connection terminal T13 and an internal connection terminal T14.

The downward signal passing circuit 300a is constituted from an HPF 301 for cutting off the upward signal, a unilateral amplifier 302 and an LPF 303 for cutting off the in-building upward signal. The upward signal frequency-conversion circuit 300b is constituted from an HPF 304 for cutting off the downward signal, a mixer 305, a local signal oscillator 306, a BPF 307, a unilateral amplifier 308 and an LPF 309 for cutting off the downward signal.

And the frequency band of the HPF 301 for passing signal is equal to or higher than 54 MHz, the frequency band of the LPF 303 for passing signal is equal to or lower than 890 MHz, the frequency band of the HPF 304 for passing signal is equal to or higher than 913 MHz, the oscillation frequency of the local signal oscillator 306 is 955 MHz, the frequency band of the BPF 307 for passing signal is from 5 MHz to 42 MHz and the frequency band of the LPF 309 for passing signal is equal to or lower than 42 MHz.

The unilateral amplifier 302 is for compensating the loss of the downward signal when the signal is passed through the HPF-301, LPF 303 and the like and the unilateral amplifier 308 is for compensating the loss of the upward signal and the in-building upward signal when the signal is passed through the HPF 304, the BPF 307, the LPF 309 and the like.

Then, the downward signal with a frequency from 54 MHz to 890 MHz inputted from the external connection terminal T13 is outputted from the internal connection terminal T14 via the HPF 301, the unilateral amplifier 302 and the LPF 303. On the other hand, the in-building upward signal with a frequency from 913 MHz to 950 MHz inputted from the internal connection terminal T14 is inputted to the mixer 305 via the HPF 304 and the mixer 305 frequency-converts the in-building upward signal using a signal with the frequency of 955 MHz inputted from the local signal oscillator 306 to restore the upward signal with a frequency from 5 MHz to 42 MHz. And the upward signal is outputted from the external connection terminal T13 via the BPF 307, the unilateral amplifier 308 and the LPF 309.

However, the frequency band of the BPF 207 for passing signal is from 913 MHz to 950 MHz, the frequency of the local signal generated by the local signal oscillator 206 is 955 MHz and the difference of the frequency between these signals is small. Therefore the local signal can not be removed well by the BPF 207 and actually leaks out from the first connection terminal T11 to the down-converter 300 together with the in-building upward signal.

And when the leak local signal leaking out from the up-converter 200 is inputted to the down-converter 300 together with the in-building upward signal, the leak local signal and the in-building upward signal is inputted to the mixer 305. Since the frequency of leak local signal is the same as that of the local signal generated by the local signal oscillator 306 constituting the down-converter 300 but the phase of these signals deviates a little from each other, the mixer 305 restores the upward signal from the in-building upward signal using the local signal with low purity made by superimposing the leak local signal to the regular local signal. Accordingly the frequency-converted upward signal contains a phase noise with a width of frequency ranging to the higher and lower sides of its frequency.

Therefore, in the present embodiment, the upward signal frequency-conversion circuit 200b constituting the up-converter 200 is provided with a local signal removal circuit 200c constituted from a directional coupler 211, a unilateral amplifier 212, a gain controller (referred to as a GC hereinafter) 213 for adjusting level, a GC 214 for compensating temperature and a phase inversion transformer 215.

The directional coupler 211 is for branching the local signal generated by the local signal oscillator 206.

The unilateral amplifier 212 is for compensating the loss of the local signal when the signal is passed through the directional coupler 211 and the like.

The GC 213 for adjusting level is for making the level of the leak local signal generated by the local signal oscillator 206 and inputted to the phase inversion transformer 215 via the directional coupler 211, the mixer 205, the BPF 207, the unilateral amplifier 208 and the ATT 209, and the level of the local signal generated by the local signal oscillator 206 and inputted to the phase inversion transformer 215 via the directional coupler 211, the unilateral amplifier 212, the GC 213 for adjusting level and the GC 214 for compensating temperature nearly coincide with each other in a state in which the mixer 205 is being operated at the reference temperature.

The GC 214 for compensating temperature makes the levels of the above-mentioned leak local signal and local signal nearly coincide with each other by controlling the level of the local signal inputted to the phase inversion transformer 215 via the directional coupler 211, the unilateral amplifier 212, the GC 213 for adjusting level and the GC 214 for compensating temperature, in response to the fluctuation of the level of the leak local signal inputted to the phase inversion transformer 215 via the directional coupler 211, the mixer 205, the BPF 207, the unilateral amplifier 208 and the ATT 209 when the level of the leak local signal is fluctuated according to the temperature rise due to the heat generation in the mixer 205.

The phase inversion transformer 215 is for inverting the phase of the local signal generated by the local signal oscillator 206 and transmitted via the directional coupler 211, the unilateral amplifier 212, the GC 213 for adjusting level and the GC 214 for compensating temperature and for mixing it with the leak local signal generated by the local signal oscillator 206 and transmitted via the directional coupler 211, the mixer 205, the BPF 207, the unilateral amplifier 208 and the ATT 209.

Therefore, the leak local signal generated by the local signal oscillator 206 and transmitted via the directional coupler 211, the mixer 205, the BPF 207, the unilateral amplifier 208 and the ATT 209, and the local signal generated by the local signal oscillator 206 and transmitted via the directional coupler 211, the unilateral amplifier 212, the GC 213 for adjusting level and the GC 214 for compensating temperature are mixed in a state in which the levels of these signals are nearly the same and the phases of these signals are inverted from each other in the phase inversion transformer 215.

In the present embodiment, the whole downward signal passing circuit 200a corresponds to a downward signal path, the whole upward signal frequency-conversion circuit 200b corresponds to an upward signal path, the local signal oscillator 206 corresponds to a high frequency signal generating means, the mixer 205 corresponds to a frequency-conversion means, the local signal removal circuit 200c corresponds to a high frequency signal removal means, the directional coupler 211 corresponds to a high frequency signal branch means, the phase inversion transformer 215 corresponds to a phase-inverted high frequency signal mixing means and the GC 213 for adjusting level and the GC 214 for compensating temperature correspond to a level adjusting means.

Subsequently, the effect of the in-building CATV system of the present embodiment will be described:

In the in-building CATV system, since the local signal generated by the local signal oscillator 206 is branched by the directional coupler 211 and mixed by the phase inversion transformer 215 in a state in which the level of the local signal is nearly the same and the phase of the local signal is inverted as mentioned above, for removing the leak local signal generated by the local signal oscillator 206 and leaking out via the directional coupler 211, the mixer 205, the BPF 207, the unilateral amplifier 208 and the ATT 209, the two local signals are offset by each other and so the leak local signal is removed.

Since the leak local signal is not inputted to the down-converter 300 when the leak local signal is removed in such a way, the down-converter 300 can correctly frequency-convert the in-building upward signal to the original upward signal without being influenced by the leak local signal.

Therefore, the in-building CATV system of the present embodiment can be constituted so that the upward signal outputted from the personal computer 117 can be transmitted to the external bidirectional CATV system without deteriorating its quality.

Also the local signal removal circuit 200c is constituted such that the local leak signal is removed by branching the local signal generated by the local signal oscillator 206 by the directional coupler 211 and by mixing the branched local signal with the leak local signal after phase-inverting the branched local signal by the phase inversion transformer 215. Therefore, there is no need to provide additionally an oscillator for generating a signal for removing the leak local signal and the number of parts is not increased.

Furthermore, since the local signal removal circuit 200c is provided with the GC 213 for adjusting level and the GC 214 for compensating temperature and constituted to make the level of the leak local signal generated by the local signal oscillator 206 and inputted to the phase inversion transformer 215 via the directional coupler 211, the mixer 205, the BPF 207, the unilateral amplifier 208 and an ATT 209, and the level of the local signal generated by the local signal oscillator 206 and inputted to the phase inversion transformer 215 via the directional coupler 211, the unilateral amplifier 212, the GC 213 for adjusting level and the GC 214 for compensating temperature nearly coincide with each other, the leak local signal can be surely removed.

Figure 12A:
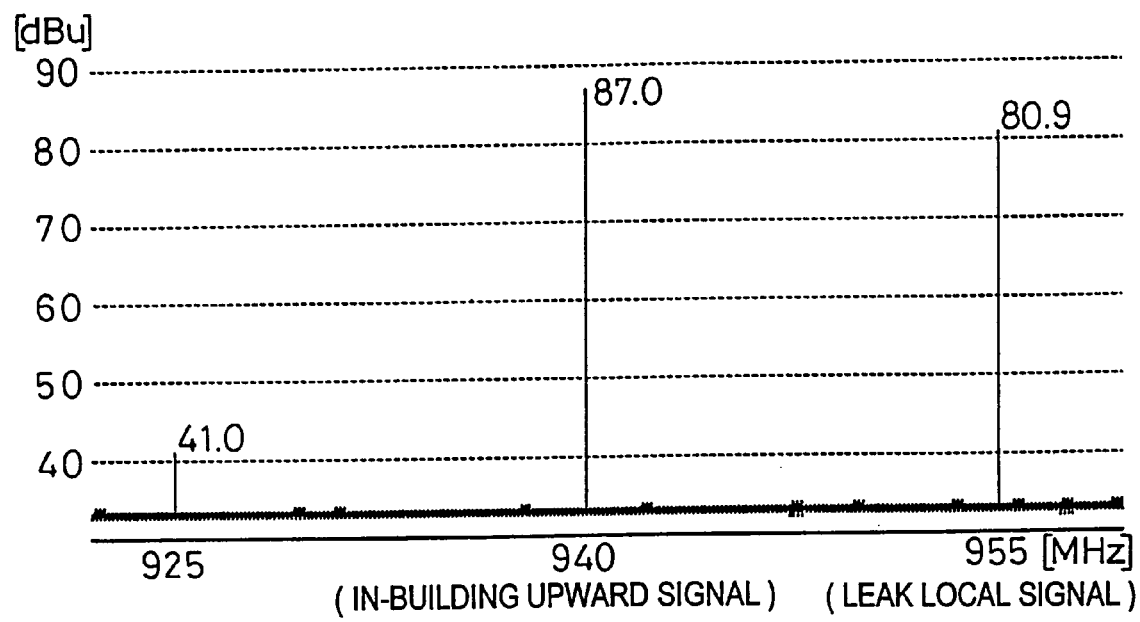
FIGS. 12A and 12B are explanatory diagrams showing the effect obtained when a local signal removal circuit is provided to the up-converter of the second embodiment, thereby FIG. 12A showing an output signal in a state without the local signal removal circuit and FIG. 12B showing an output signal in a state with the local signal removal circuit.
Figure 12B:
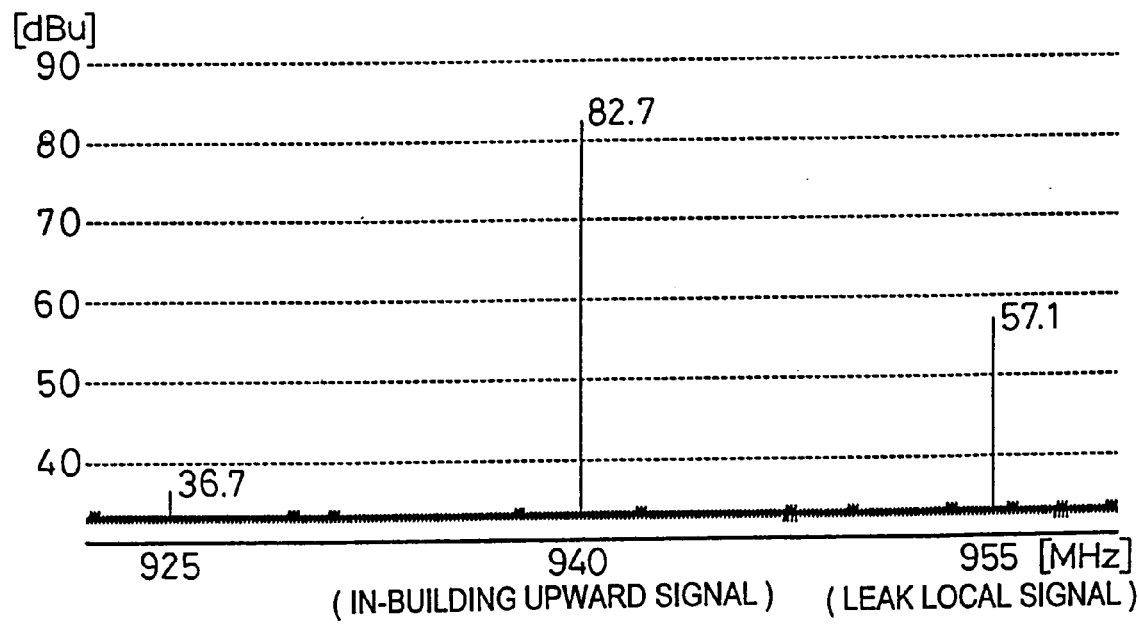

Subsequently, the effect of providing the local signal removal circuit 200c in the up-converter 200 will be described in the following:

FIG. 12A shows what signals are outputted from the first connection terminal T11 when a sine wave signal of 15 MHz and 100 dB $\mu$ is inputted from the second connection terminal T12 in a state in which the up-converter 200 is not provided with the local signal removal circuit 200c, that is, a state in which the local signal oscillator 206 and the mixer 205 is directly connected and the ATT 209 and the HPF 210 is directly connected in FIG. 10. FIG. 12B shows what signals are outputted from the first connection terminal T11 when a sine wave signal of 15 MHz and 100 dB $\mu$ is inputted from the second connection terminal T12 in a state in which the up-converter 200 is provided with the local signal removal circuit 200c, that is, a state shown in FIG. 10.

As evidently shown by the comparison of FIG. 12A and FIG. 12B, the level of the signal of 955 MHz (leak local signal) outputted from the first connection terminal T11 is decreased significantly (23.8 dB) by providing the local signal removal circuit 200c in the up-converter 200. On the other hand, the level of the signal of 940 MHz (in-building upward signal) drops only a little (4.3 dB). The highest noise in the range from 913 MHz to 950 MHz is the noise of 925 MHz (36.7 dB), but the difference of this noise and the in-building upward signal is big enough (46 dB).

In the above-mentioned embodiment, the in-building CATV system is constituted such that the local signal oscillator 206 provided in the up-converter 200 and a local signal oscillator 306 provided in the down-converter 300 generate the local signals independently. However the in-building CATV system may be constituted in such a way that the down-converter 300 is provided with a reference oscillator for generating a reference signal with a frequency lower than that of the downward signal, the frequency of the local signal generated by the local signal oscillator 306 is controlled to be a constant frequency by carrying out PLL control using the reference signal, and the reference signal is transmitted to the up-converter 200 from the down-converter 300 and the frequency of the local signal generated by the local signal oscillator 206 is controlled to be a constant frequency by carrying out PLL control using the reference signal in the up-converter 200. Since in such a constitution, the quantity of the frequency-conversion from the upward signal to the in-building upward signal in the up-converter 200 can be made to strictly correspond to the quantity of the frequency-conversion from the in-building upward signal to the upward signal in the down-converter 300, the original upward signal can be correctly restored from the frequency-converted in-building upward signal.

Though in the above-mentioned embodiment, local signal removal circuit 200c is constituted such that the local signal generated by the local signal oscillator 206 is branched by the directional coupler 211 and is mixed with the leak local signal by the phase inversion transformer 215 to remove the leak local signal, a oscillator to generate a signal for removing the leak local signal may be provided additionally if increase of parts does not become a problem.

Though the present embodiments were described above, the present invention is not limited to the above-mentioned embodiments and, needless to say, can be embodied variously.

For example, in the above-mentioned first and second embodiments, the in-building CATV system is constituted such that a signal in the same frequency band as that of the upward signal outputted from the modem 22 (118) is outputted to the external bi-directional CATV system after frequency-converting the upward signal or the in-building upward signal using the high frequency signal with the same frequency in the up-converter 20 (200) and the down-converter 10 (300), respectively. However, the in-building CATV system may be constituted such that the original upward signal from the modem 22 (118) is different from the upward signal for outputting to the external bi-directional CATV system in frequencies by using high frequency signals with different frequencies in the up-converter 20 (200) and the down-converter 10 (300), respectively.

Specifically, for example, when the frequency band of the original upward signal outputted from the modem 22 (118) is set to 10 MHz–20 MHz and the frequencies of the high frequency signal for frequency-conversion used in the up-converter 20 (200) and down-converter 10 (300) are set to 935 MHz and 955 MHz, respectively, the frequency band of the in-building upward signal becomes 935 MHz–945 MHz, and the frequency band of the upward signal for outputting to the external bi-directional CATV system can be set to 20 MHz–30 MHz.

We claim:

1. An in-building CATV system connected to a lead-in wire of an external bi-directional CATV system for transmitting a downward signal inputted from the lead-in wire to plural terminals in a building, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bi-directional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal;

wherein the noise removal means comprises a trap circuit;

a frequency of the high frequency signal for frequency-conversion is set to a frequency higher than that of the in-building upward signal;

the trap circuit is provided in at least one of the transmission device the up-converter and the down-converter, the transmission device is provided on a transmission path from the down-converter to each terminal; and the trap circuit is constituted by connecting a resonance circuit to the transmission path of the in-building upward signal via an inductive reactance.

2. An in-building CATV system connected to a lead-in wire of an external bidirectional CATV system for transmitting a downward signal inputted from the lead-in wire to plural terminals in a building, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bidirectional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal;

wherein the noise removal means comprises a trap circuit;

a frequency of the high frequency signal for frequency-conversion is set to a frequency lower than that of the in-building upward signal;

the trap circuit is provided in at least one of the transmission device the up-converter, and the down-converter, the transmission device is provided on a transmission path from the down-converter to each terminal; and the trap circuit is constituted by connecting a resonance circuit to the transmission path of the in-building upward signal via a capacitive reactance.

3. An in-building CATV system connected to a lead-in wire of an external bidirectional CATV system for transmitting a downward signal inputted from the lead-in wire to plural terminals in a building, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bidirectional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal;

wherein the noise removal means comprises a trap circuit; and an equalizer for compensating a transmission loss in a frequency band of the in-building upward signal occurring when the in-building upward signal is passed through the trap circuit is provided on an output path of the up-ward signal in the down-converter and on an input path of the up-ward signal in the up-converter; and the trap circuit is provided in at least one of the transmission device, the up-converter and down-converter, the transmission device is provided on a transmission path from the down-converter to each terminal, the transmission path of the upward signal outputted from the terminal device and the transmission path of the upward signal outputted from the down-converter.

4. A down-converter provided between a lead-in wire from an external bidirectional CATV system and a transmission line in a building, in an in-building CATV system connected to the lead-in wire of the external bi-directional CATV system for transmitting a downward signal inputted from the lead-in wire to plural terminals in a building, the in-building CATV system, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bi-directional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal, and the down converter, comprising:

a downward signal path of the down-converter for transmitting a downward signal inputted from the external bidirectional CATV system via the lead-in wire to the transmission line;

a high frequency signal generating means of the down-converter for generating a high frequency signal for frequency-converting the in-building upward signal outputted from the up-converter to an upward signal with a frequency lower than that of the downward signal for being transmitted to the external bidirectional CATV system;

a frequency conversion means of the down-converter for taking the in-building upward signal transmitted from the up-converter via the transmission line, frequency-converting the in-building upward signal to the upward signal for being outputted to the external bi-directional CATV system by mixing the in-building upward signal and the high frequency signal generated by the high frequency signal generating means of the down-converter and transmitting the frequency-converted upward signal to the lead-in wire; and a trap circuit provided on an input path of the in-building upward signal to the frequency conversion means of the down-converter.

5. A down-converter provided between a lead-in wire from an external bidirectional CATV system and a transmission line in a building, in the in-building CATV system according to claim 3, comprising:

a downward signal path of the down-converter for transmitting a downward signal inputted from the external bidirectional CATV system via the lead-in wire to the transmission line;

a high frequency signal generating means of the down-converter for generating a high frequency signal for frequency-converting the in-building upward signal outputted from the up-converter to an upward signal with a frequency lower than that of the downward signal for being transmitted to the external bidirectional CATV system;

a frequency conversion means of the down-converter for taking in the in-building upward signal transmitted from the up-converter via the transmission line, frequency-converting the in-building upward signal to the upward signal for being outputted to the external bi-directional CATV system by mixing the in-building upward signal and the high frequency signal generated by the high frequency signal generating means of the down-converter, and transmitting the frequency-converted upward signal to the lead-in wire; and an equalizer on at least one of an input path of the in-building upward signal to the frequency conversion means of the down-converter and an output path of the frequency-converted upward signal from the frequency-conversion means of down-converter.

6. An up-converter provided between a terminal and a subscriber terminal device in an in-building CATV system connected to a lead-in wire of an external bidirectional CATV system for transmitting a downward signal inputted from the lead-in wire to plural terminals in a building, the in-building CATV system, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bi-directional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal, and the up converter, comprising:

a downward signal path of the up-converter for transmitting the downward signal transmitted from the external bi-directional CATV system via the down-converter and the transmission line to the subscriber terminal device;

a high frequency signal generating means of the up-converter for generating a high frequency signal for frequency-converting the original upward signal outputted from the subscriber terminal device to the in-building upward signal in a predetermined frequency band;

a frequency conversion means of the up-converter for taking in the original upward signal outputted from the subscriber terminal device, frequency-converting the original upward signal to the in-building upward signal by mixing the original upward signal and the high frequency signal generated by the high frequency signal generating means of the up-converter and outputting the frequency-converted in-building upward signal to the terminal side; and a trap circuit on the output path of the in-building upward signal from the frequency conversion means of the up-converter.

7. An up-converter provided between a terminal and a subscriber terminal device in the in-building CATV system according to claim 3, comprising:

a downward signal path of the up-converter for transmitting the downward signal transmitted from the external bi-directional CATV system via the down-converter and the transmission line to the subscriber terminal device;

a high frequency signal generating means of the up-converter for generating a high frequency signal for frequency-converting the original upward signal outputted from the subscriber terminal device to the in-building upward signal in a predetermined frequency band;

a frequency conversion means of the up-converter for taking in the original upward signal outputted from the subscriber terminal device, frequency-converting the original upward signal to the in-building upward signal by mixing the original upward signal and the high frequency signal generated by the high frequency signal generating means of the up-converter and outputting the frequency-converted in-building upward signal to the terminal; and an equalizer on at least one of an input path of the original upward signal outputted from the subscriber terminal device to the frequency conversion means of the up-converter and an output path of the in-building upward signal from the frequency conversion means of the up-converter.

8. An amplifier provided on a transmission line from a down-converter to each terminal for amplifying signals flowing through the transmission line in an in-building CATV system connected to a lead-in wire of an external bi-directional CATV system for transmitting a downward signal inputted from the lead-in wire to plural terminals in a building, the in-building CATV system, comprising:

an up-converter for original frequency-converting an upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bi-directional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal, and the amplifier, comprising:

a downward signal path of the amplifier for transmitting the downward signal transmitted from the down-converter to the terminal;

an in-building upward signal path for transmitting the in-building upward signal transmitted from the up-converter connected to the terminal to the down-converter;

a signal amplification means provided at least on one of the downward signal path of the amplifier and the in-building upward signal path for amplifying at least one of the downward signal and the upward signal flowing through at least one of the downward signal path of the amplifier and the in-building upward signal path; and a trap circuit on the in-building upward signal path wherein the trap is provided in at least one of the transmission device, the up-converter, and the down-converter, the transmission device is provided on a transmission path from the down-converter to each terminal.

9. An amplifier provided on a transmission line from a down-converter to each terminal for amplifying signals flowing through the transmission line in the in-building CATV system according to claim 3, comprising:

a downward signal path of the amplifier for transmitting the downward signal transmitted from the down-converter to the terminal;

an in-building upward signal path for transmitting the in-building upward signal transmitted from the up-converter connected to the terminal to the down-converter;

a signal amplification means provided at least on one of the downward signal path of the amplifier and the in-building upward signal path for amplifying at least one of the downward signal and the upward signal flowing through at least one of the downward signal path of the amplifier and the in-building upward signal path; and an equalizer on the in-building upward signal path.

10. An in-building CATV system connected to a lead-in wire of an external bidirectional CATV system for transmitting a downward signal inputted from the lead-in wire to plural terminals in a building, comprising:

an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;

a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bi-directional CATV system via the lead-in wire; and a noise removal means provided on a transmission path of the in-building upward signal from the up-converter to the down-converter for removing a high frequency signal with a specific frequency used in the up-converter for frequency-converting the original upward signal outputted from the subscriber terminal device to the in-building upward signal, wherein the up-converter provided between the terminal and the subscriber terminal device comprises:

a downward signal path for transmitting the downward signal transmitted from the external bidirectional CATV system via the down-converter and the transmission line to the subscriber terminal device;

an upward signal path for transmitting the upward signal outputted from the subscriber terminal device to the terminal;

a high frequency signal generating means for generating a high frequency signal for frequency-converting the original upward signal outputted from the subscriber terminal device to the in-building upward signal in a predetermined frequency band; and a frequency conversion means for frequency-converting the original upward signal from the subscriber terminal device to the in-building upward signal by mixing the original upward signal with the high frequency signal generated by the high frequency signal generating means and for transmitting the in-building upward signal on the upward signal path; and the noise removal means is provided in the up-converter and comprises a high frequency signal removal means for removing a leak-out high frequency signal from the upward signal path by mixing the leak-out high frequency signal leaking out to the terminal side on the upward signal path together with the in-building upward signal when the frequency conversion means frequency-converts; with a phase-inverted high frequency signal whose phase is inverted against a phase of the high frequency signal generated by the high frequency signal generating means and by offsetting the leak-out high frequency signal by the phase-inverted high frequency signal.

11. The in-building CATV system according to claim 10, wherein the high frequency signal removal means comprises:
a high frequency signal branch means for branching the high frequency signal generated by the high frequency signal generating means and transmitted to the frequency conversion means; and
a phase-inverted high frequency signal mixing means for mixing the phase-inverted high frequency signal made by phase-inverting the high frequency signal branched by the high frequency signal branch means with the high frequency signal transmitted through the upward signal path.

12. The in-building CATV system according to claim 10, wherein the high frequency signal removal means comprises:
a level adjusting means for adjusting the level of the phase-inverted high frequency signal so that the level of the phase-inverted high frequency signal becomes nearly the same as the level of the high frequency signal transmitted through the upward signal path.

13. An up-converter provided between a terminal and a terminal device in the in-building CATV system according to claim 10, comprising:
a downward signal path for transmitting the downward signal from the external bidirectional CATV system transmitted via the down-converter and the transmission line to the subscriber terminal device;
an upward signal path for transmitting the upward signal outputted from the subscriber terminal device to the terminal;
a high frequency signal generating a high frequency signal for frequency-converting the original upward signal outputted from the subscriber terminal device to the in-building upward signal in a predetermined frequency band;
a frequency conversion means for frequency-converting the original upward signal from the subscriber terminal device to the in-building upward signal by mixing the original upward signal transmitted from the subscriber terminal device with the high frequency signal generated by the high frequency signal generating means and for transmitting the in-building upward signal to the terminal on of the upward signal path; and
the noise removal means including a high frequency signal removal means;
wherein the high frequency signal removal means removes a leak-out high frequency signal from the upward signal path by mixing the leak-out high frequency signal leaking out to the terminal on the upward signal path together with the in-building upward signal when the frequency conversion means frequency-converts, with a phase-inverted high frequency signal whose phase is inverted against the phase of the high frequency signal generated by the high frequency signal generating means and by offsetting the leak-out high frequency signal by the phase-inverted high frequency signal.

14. The up-converter according to claim 13, wherein the high frequency signal removal means comprises:

a high frequency signal branch means for branching the high frequency signal generated by the high frequency signal generating means and transmitted to the high frequency conversion means; and
a phase-inverted high frequency signal mixing means for mixing the phase-inverted high frequency signal made by phase-inverting the high frequency signal branched by the high frequency signal branch means with the high frequency signal transmitted through the upward signal path.

15. The up-converter according to claim 13, wherein the high frequency signal removal means comprises:
a level adjusting means for adjusting level of the phase-inverted high frequency signal so that the level of the phase-inverted high frequency signal becomes nearly the same as level of the high frequency signal transmitted through the upward signal path.

16. An in-building CATV system connected to a lead-in wire of an external bi-directional CATV system for transmitting a downward signal inputted from the lead-in wire to plural terminals in a building, comprising:
an up-converter for frequency-converting an original upward signal outputted from a subscriber terminal device to an in-building upward signal having a frequency higher than that of the downward signal and for transmitting the in-building upward signal toward the lead-in wire from each terminal via a transmission line;
a down-converter provided between the transmission line and the lead-in wire for frequency-converting the in-building upward signal to an upward signal with a frequency lower than that of the downward signal for outputting to the external bi-directional CATV system and for transmitting a frequency-converted upward signal to the external bidirectional CATV system via the lead-in wire; and
a noise removal means provided on a transmission path of the in-building upward signal from the up-converter to the down-converter for removing a high frequency signal with a specific frequency used in the up-converter for frequency-converting an original upward signal outputted from the subscriber terminal device to the in-building upward signal;
wherein the noise removal means comprises a high frequency signal removal means for removing a leak-out high frequency signal from an upward signal path by mixing the leak-out high frequency signal leaking out on the upward signal path of the in-building upward signal together with the in-building upward signal in the high frequency signal with and by offsetting the leak-out high frequency signal by the phase-inverted high frequency signal.

17. The in-building CATV system according to claim 16, wherein the up-converter is constituted to frequency-convert the original upward signal outputted from the subscriber terminal device using a high frequency signal for frequency-converting the upward signal and
the down converter is constituted to frequency-convert the in-building upward signal using the high frequency signal for frequency-converting the upward signal.

* * * * *